(12) United States Patent
Hiraiwa et al.

(10) Patent No.: US 7,859,747 B2
(45) Date of Patent: Dec. 28, 2010

(54) INFRARED ZOOM LENS AND INFRARED CAMERA

(75) Inventors: Chihiro Hiraiwa, Osaka (JP); Tatsuya Izumi, Osaka (JP)

(73) Assignee: Sumitomo Electric Industries, Ltd., Osaka-shi (JP)

(*) Notice: Subject to any disclaimer, the term of this patent is extended or adjusted under 35 U.S.C. 154(b) by 0 days.

(21) Appl. No.: 12/281,257

(22) PCT Filed: Feb. 21, 2007

(86) PCT No.: PCT/JP2007/053217

§ 371 (c)(1),
(2), (4) Date: Aug. 29, 2008

(87) PCT Pub. No.: WO2007/099836

PCT Pub. Date: Sep. 7, 2007

(65) Prior Publication Data

US 2009/0168153 A1    Jul. 2, 2009

(30) Foreign Application Priority Data

Mar. 1, 2006    (JP)    ............................. 2006-054397

(51) Int. Cl.
*G02B 13/14* (2006.01)
(52) U.S. Cl. ..................................... 359/356; 359/690
(58) Field of Classification Search ................. 359/354, 359/356, 357, 690
See application file for complete search history.

(56) References Cited

U.S. PATENT DOCUMENTS

| 4,397,520 | A | * | 8/1983 | Neil | ............................. | 359/354 |
| 4,802,717 | A | * | 2/1989 | Kebo | ........................... | 359/354 |
| 5,114,238 | A | * | 5/1992 | Sigler | .......................... | 359/399 |
| 5,504,628 | A | * | 4/1996 | Borchard | .................... | 359/796 |
| 5,796,514 | A | * | 8/1998 | Chipper | ....................... | 359/354 |
| 5,880,879 | A | * | 3/1999 | Foo | .............................. | 359/356 |

(Continued)

FOREIGN PATENT DOCUMENTS

JP    03-044612    2/1991

(Continued)

*Primary Examiner*—Mark Consilvio
(74) *Attorney, Agent, or Firm*—Venable LLP; Michael A. Sartori; Steven J. Schwarz

(57) ABSTRACT

A small-sized and low-cost infrared zoom lens while maintaining the brightness of an image and relevant arts to the infrared zoom lens is provided. The infrared zoom lens 1a is made up of first to third lens groups G1 to G3 formed of zinc sulfide. The first lens group G1 is made up of one or two lenses and has a positive refractive power. The second lens group G2 is made up of one or two lenses and has a negative refractive power. The third lens group G3 is made up of two or more lenses and has a positive refractive power as the whole lens group and also includes a positive meniscus lens with a convex face pointed at the object side as a final lens on the image surface side. At the zooming time, the second lens group G2 is moved along the optical axis. At least one of the lens surfaces of the first to third lens groups G1 to G3 is a diffraction surface. At least one of the lens surfaces of the first and third lens groups G1 and G3 is an aspheric surface.

8 Claims, 57 Drawing Sheets

| U.S. PATENT DOCUMENTS | | | | |
|---|---|---|---|---|
| 5,940,224 A | * | 8/1999 | Zhang | 359/749 |
| 5,978,132 A | * | 11/1999 | Ulrich | 359/355 |
| 6,111,689 A | * | 8/2000 | Shibata | 359/356 |
| 6,424,460 B1 | * | 7/2002 | Kirkham | 359/353 |
| 6,999,243 B2 | | 2/2006 | Chipper | |

FOREIGN PATENT DOCUMENTS

| JP | 10-213746 | 11/1998 |
|---|---|---|
| JP | 2003-295052 | 10/2003 |
| JP | 2005-521918 | 7/2005 |
| JP | 2006-047343 | 2/2006 |
| WO | WO-03/085437 A2 | 10/2003 |

* cited by examiner

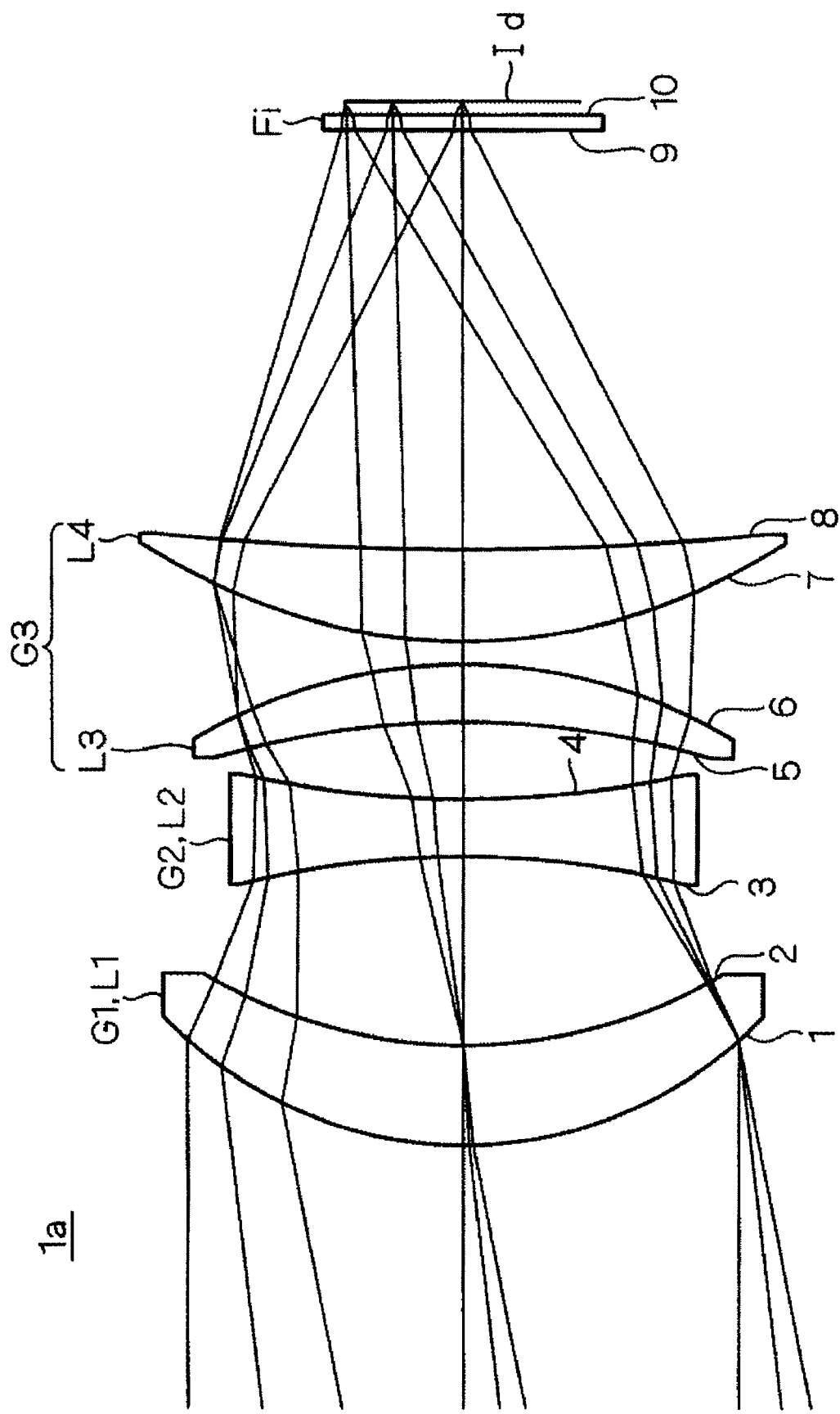

FIG. 3

| SURFACE NUMBER | SURFACE TYPE | CURVATURE RADIUS | SURFACE SPACING | APERTURE RADIUS | MATERIAL |
|---|---|---|---|---|---|
| 1 | SPHERICAL SURFACE | 17.3741 | 4.4253 | 11.8232 | ZnS |
| 2 | DIFFRACTION SPHERICAL SURFACE | 20.7071 | 3.2387 | 10.5733 | |
| 3 | ASPHERIC SURFACE | -43.2110 | 2.5000 | 9.0827 | ZnS |
| 4 | DIFFRACTION SPHERICAL SURFACE | 42.9388 | 7.2082 | 9.0615 | |
| 5 | ASPHERIC SURFACE | -38.8840 | 2.5000 | 10.0514 | ZnS |
| 6 | SPHERICAL SURFACE | -23.4994 | 1.0000 | 10.4834 | |
| 7 | SPHERICAL SURFACE | 22.8617 | 4.0000 | 12.5497 | ZnS |
| 8 | DIFFRACTION ASPHERIC SURFACE | 140.7294 | 17.8236 | 12.3208 | |
| 9 | SPHERICAL SURFACE | INFINITE | 0.6350 | 5.2934 | Ge |
| 10 | SPHERICAL SURFACE | INFINITE | 0.5973 | 5.2328 | |
| IMAGE | SPHERICAL SURFACE | INFINITE | 0.0000 | 5.0000 | |

FIG. 4

| SURFACE NUMBER | K | A | B | C | D |
|---|---|---|---|---|---|
| THIRD SURFACE | 4.751754 | -0.378620E-05 | 0.119147E-06 | 0.193482E-08 | -0.373629E-11 |
| FOURTH SURFACE | 0.254665 | -0.282228E-06 | 0.765324E-07 | -0.181382E-09 | 0.738584E-12 |
| EIGHTH SURFACE | 38.135240 | 0.210023E-05 | 0.455884E-07 | -0.960561E-11 | -0.468266E-12 |

| SURFACE NUMBER | C1 | C2 | C3 | C4 | C5 |
|---|---|---|---|---|---|
| SECOND SURFACE | 2.2812E-03 | -5.8442E-06 | 6.9470E-08 | -3.2217E-10 | 1.3382E-12 |
| FOURTH SURFACE | 3.7653E-03 | -7.1327E-06 | 3.2645E-08 | 1.8176E-10 | 4.5622E-12 |
| EIGHTH SURFACE | 4.2022E-03 | -4.0785E-06 | 2.5484E-08 | -7.1109E-11 | |

FIG. 21

| SURFACE NUMBER | SURFACE TYPE | CURVATURE RADIUS | SURFACE SPACING | APERTURE RADIUS | MATERIAL |
|---|---|---|---|---|---|
| 1 | ASPHERIC SURFACE | 15.6896 | 3.5000 | 8.9346 | ZnS |
| 2 | DIFFRACTION SPHERICAL SURFACE | 39.2770 | 0.8819 | 8.2650 | |
| 3 | SPHERICAL SURFACE | -18.4829 | 1.5000 | 6.9422 | ZnS |
| 4 | DIFFRACTION ASPHERICAL SURFACE | 15.4790 | 2.5533 | 7.0292 | |
| 5 | SPHERICAL SURFACE | 29.1019 | 2.5000 | 10.2271 | ZnS |
| 6 | SPHERICAL SURFACE | 343.3278 | 1.1257 | 10.3050 | |
| 7 | ASPHERIC SURFACE | 26.6417 | 4.0000 | 10.8017 | ZnS |
| 8 | DIFFRACTION SPHERICAL SURFACE | -27.5808 | 12.9776 | 10.9135 | |
| 9 | SPHERICAL SURFACE | INFINITE | 0.6350 | 5.2701 | Ge |
| 10 | SPHERICAL SURFACE | INFINITE | 0.5973 | 5.2147 | |
| IMAGE | SPHERICAL SURFACE | INFINITE | 0.0000 | 5.0000 | |

FIG. 22

| SURFACE NUMBER | K | A | B | C | D |
|---|---|---|---|---|---|
| FIRST SURFACE | -0.273562 | -0.135841E-04 | 0.768865E-07 | 0.443679E-08 | 0.265898E-10 |
| FOURTH SURFACE | -5.809242 | -0.452598E-04 | -0.463740E-06 | 0.281072E-07 | -0.307505E-09 |
| SEVENTH SURFACE | -23.695856 | 0.316586E-04 | -0.101356E-05 | 0.551626E-08 | -0.126596E-10 |

| SURFACE NUMBER | C1 | C2 | C3 | C4 | C5 |
|---|---|---|---|---|---|
| SECOND SURFACE | 1.3840E-03 | 4.4049E-05 | -3.4153E-07 | -4.2973E-09 | 6.5459E-11 |
| FOURTH SURFACE | 2.1485E-03 | 7.4535E-05 | 9.0294E-07 | -4.9095E-08 | 4.8998E-10 |
| EIGHTH SURFACE | 4.7719E-03 | 9.5683E-07 | 1.3133E-07 | -7.5457E-10 | |

FIG. 25

| SURFACE NUMBER | SURFACE TYPE | CURVATURE RADIUS | SURFACE SPACING | APERTURE RADIUS | MATERIAL |
|---|---|---|---|---|---|
| 1 | ASPHERIC SURFACE | 17.6090 | 3.1377 | 14.7998 | ZnS |
| 2 | DIFFRACTION SPHERICAL SURFACE | 17.7917 | 8.5677 | 13.6167 | |
| 3 | SPHERICAL SURFACE | -74.9334 | 3.5000 | 11.3738 | ZnS |
| 4 | DIFFRACTION ASPHERIC SURFACE | 242.2673 | 13.2868 | 11.5561 | |
| 5 | SPHERICAL SURFACE | -45.8816 | 2.8724 | 14.0991 | ZnS |
| 6 | SPHERICAL SURFACE | -29.1156 | 1.0000 | 14.5433 | |
| 7 | ASPHERIC SURFACE | 20.4783 | 6.0000 | 16.4021 | ZnS |
| 8 | DIFFRACTION SPHERICAL SURFACE | 33.9928 | 19.1219 | 15.4356 | |
| 9 | SPHERICAL SURFACE | INFINITE | 0.6350 | 5.4645 | Ge |
| 10 | SPHERICAL SURFACE | INFINITE | 0.5973 | 5.3776 | |
| IMAGE | SPHERICAL SURFACE | INFINITE | 0.0000 | 5.0000 | |

FIG. 26

| SURFACE NUMBER | K | A | B | C | D |
|---|---|---|---|---|---|
| FIRST SURFACE | -0.133366 | -0.796022E-06 | 0.185991E-08 | 0.228803E-10 | -0.519503E-13 |
| FOURTH SURFACE | -1004.409054 | 0.452099E-05 | 0.379452E-07 | 0.255963E-09 | 0.413494E-12 |
| SEVENTH SURFACE | -0.081946 | -0.121249E-05 | -0.236113E-08 | -0.853874E-11 | -0.133144E-14 |

| SURFACE NUMBER | C1 | C2 | C3 | C4 | C5 |
|---|---|---|---|---|---|
| SECOND SURFACE | -1.1089E-03 | -1.9611E-06 | 8.1236E-10 | 7.6049E-11 | -3.0436E-13 |
| FOURTH SURFACE | 2.0195E-03 | 8.9107E-06 | -9.9524E-08 | 5.1057E-10 | -5.6530E-13 |
| EIGHTH SURFACE | 4.0495E-03 | -8.0891E-07 | 4.1947E-09 | -1.4976E-11 | |

FIG. 29

| SURFACE NUMBER | SURFACE TYPE | CURVATURE RADIUS | SURFACE SPACING | APERTURE RADIUS | MATERIAL |
|---|---|---|---|---|---|
| 1 | ASPHERIC SURFACE | 15.5712 | 3.5000 | 8.9081 | ZnS |
| 2 | DIFFRACTION SPHERICAL SURFACE | 32.8826 | 1.0438 | 8.2092 | |
| 3 | SPHERICAL SURFACE | -19.0476 | 1.7929 | 6.9116 | ZnS |
| 4 | DIFFRACTION ASPHERIC SURFACE | 16.6178 | 2.6032 | 6.9835 | |
| 5 | SPHERICAL SURFACE | 31.0614 | 2.5000 | 10.2058 | ZnS |
| 6 | SPHERICAL SURFACE | 4298.9220 | 1.0000 | 10.2995 | |
| 7 | ASPHERIC SURFACE | 26.1428 | 4.0000 | 10.8709 | ZnS |
| 8 | DIFFRACTION SPHERICAL SURFACE | -29.5956 | 12.8260 | 10.9629 | |
| 9 | SPHERICAL SURFACE | INFINITE | 0.6350 | 5.2682 | Ge |
| 10 | SPHERICAL SURFACE | INFINITE | 0.5973 | 5.2114 | |
| IMAGE | SPHERICAL SURFACE | INFINITE | 0.0000 | 5.0000 | |

FIG. 30

| SURFACE NUMBER | K | A | B | C | D |
|---|---|---|---|---|---|
| FIRST SURFACE | -0.361610 | 0.139439E-04 | -0.162827E-06 | 0.587849E-08 | -0.245657E-10 |
| FOURTH SURFACE | -10.107971 | 0.256809E-04 | 0.386497E-07 | 0.367201E-08 | -0.117746E-09 |
| SEVENTH SURFACE | -20.011038 | 0.236892E-04 | -0.744573E-06 | 0.367624E-08 | -0.785617E-11 |

| SURFACE NUMBER | C1 | C2 | C3 | C4 | C5 |
|---|---|---|---|---|---|
| SECOND SURFACE | 2.9727E-03 | -1.1675E-05 | 9.1448E-07 | -1.9481E-08 | 1.3904E-10 |
| FOURTH SURFACE | 3.5715E-03 | 7.3023E-05 | -2.6358E-07 | -2.5372E-08 | 3.6452E-10 |
| EIGHTH SURFACE | 5.0811E-03 | -1.0510E-06 | 1.1290E-07 | -6.3496E-10 | |

FIG. 33

| SURFACE NUMBER | SURFACE TYPE | CURVATURE RADIUS | SURFACE SPACING | APERTURE RADIUS | MATERIAL |
|---|---|---|---|---|---|
| 1 | ASPHERIC SURFACE | 16.3019 | 3.4790 | 14.3506 | ZnS |
| 2 | DIFFRACTION SPHERICAL SURFACE | 16.0559 | 6.6168 | 12.9299 | |
| 3 | SPHERICAL SURFACE | -74.8307 | 3.0000 | 11.0112 | ZnS |
| 4 | DIFFRACTION ASPHERIC SURFACE | 210.0545 | 15.8408 | 11.1372 | |
| 5 | SPHERICAL SURFACE | -49.8091 | 2.9563 | 13.7832 | ZnS |
| 6 | SPHERICAL SURFACE | -29.7741 | 1.0000 | 14.2315 | |
| 7 | ASPHERIC SURFACE | 19.9532 | 5.0000 | 15.9103 | ZnS |
| 8 | DIFFRACTION SPHERICAL SURFACE | 33.9070 | 19.0308 | 15.3432 | |
| 9 | SPHERICAL SURFACE | INFINITE | 0.6350 | 5.4597 | Ge |
| 10 | SPHERICAL SURFACE | INFINITE | 0.5973 | 5.3731 | |
| IMAGE | SPHERICAL SURFACE | INFINITE | 0.0000 | 5.0000 | |

FIG. 34

| SURFACE NUMBER | K | A | B | C | D |
|---|---|---|---|---|---|
| FIRST SURFACE | -0.111664 | -0.248731E-05 | 0.144624E-07 | -0.228586E-10 | -0.814835E-13 |
| FOURTH SURFACE | -78.903521 | 0.153638E-05 | 0.406551E-07 | -0.111124E-09 | -0.217579E-12 |
| SEVENTH SURFACE | -0.021229 | -0.152056E-05 | -0.963312E-08 | 0.129495E-10 | -0.836864E-13 |

| SURFACE NUMBER | C1 | C2 | C3 | C4 | C5 |
|---|---|---|---|---|---|
| SECOND SURFACE | 1.1531E-03 | 4.6442E-06 | -4.8222E-08 | 1.8853E-10 | -1.0298E-13 |
| FOURTH SURFACE | -1.8689E-03 | -5.2189E-06 | 5.3445E-08 | -1.5932E-10 | -8.0856E-13 |
| EIGHTH SURFACE | -3.7598E-03 | 1.5192E-06 | -8.5346E-09 | 2.2519E-11 | |

FIG. 37

| SURFACE NUMBER | SURFACE TYPE | CURVATURE RADIUS | SURFACE SPACING | APERTURE RADIUS | MATERIAL |
|---|---|---|---|---|---|
| 1 | ASPHERIC SURFACE | 16.0607 | 3.5000 | 8.9632 | ZnS |
| 2 | DIFFRACTION SPHERICAL SURFACE | 49.9940 | 0.6999 | 8.3214 | |
| 3 | SPHERICAL SURFACE | -18.3821 | 1.5000 | 7.0351 | ZnS |
| 4 | DIFFRACTION ASPHERIC SURFACE | 14.1128 | 2.5413 | 7.1306 | |
| 5 | SPHERICAL SURFACE | 27.3821 | 2.5000 | 10.2476 | ZnS |
| 6 | SPHERICAL SURFACE | 186.4584 | 1.3687 | 10.3074 | |
| 7 | ASPHERIC SURFACE | 25.6603 | 4.0000 | 10.7994 | ZnS |
| 8 | DIFFRACTION SPHERICAL SURFACE | -27.8527 | 13.1953 | 10.9094 | |
| 9 | SPHERICAL SURFACE | INFINITE | 0.6350 | 5.2759 | Ge |
| 10 | SPHERICAL SURFACE | INFINITE | 0.5973 | 5.2213 | |
| IMAGE | SPHERICAL SURFACE | INFINITE | 0.0000 | 5.0000 | |

FIG. 38

| SURFACE NUMBER | K | A | B | C | D |
|---|---|---|---|---|---|
| FIRST SURFACE | -0.403292 | -0.192991E-04 | 0.886256E-07 | 0.467545E-08 | -0.300528E-10 |
| FOURTH SURFACE | -5.680919 | -0.518097E-04 | -0.588583E-06 | 0.281960E-07 | -0.279572E-09 |
| SEVENTH SURFACE | -23.552254 | 0.392110E-04 | -0.112593E-05 | 0.615274E-08 | -0.146369E-10 |

| SURFACE NUMBER | C1 | C2 | C3 | C4 | C5 |
|---|---|---|---|---|---|
| SECOND SURFACE | 1.0512E-04 | 5.4028E-05 | -4.0887E-07 | -3.4603E-09 | 5.7437E-11 |
| FOURTH SURFACE | -5.5081E-04 | 9.8430E-05 | 9.0294E-07 | -4.8370E-08 | 4.4813E-10 |
| EIGHTH SURFACE | 3.9655E-03 | 5.2547E-06 | 1.1350E-07 | -6.9000E-10 | |

FIG. 41

| SURFACE NUMBER | SURFACE TYPE | CURVATURE RADIUS | SURFACE SPACING | APERTURE RADIUS | MATERIAL |
|---|---|---|---|---|---|
| 1 | ASPHERIC SURFACE | 18.0000 | 3.0904 | 14.7976 | ZnS |
| 2 | DIFFRACTION SPHERICAL SURFACE | 18.0373 | 6.2372 | 13.6398 | |
| 3 | SPHERICAL SURFACE | -82.7697 | 2.5000 | 11.9563 | ZnS |
| 4 | DIFFRACTION ASPHERICAL SURFACE | 358.6665 | 15.5649 | 12.0702 | |
| 5 | SPHERICAL SURFACE | -104.5670 | 2.5000 | 13.6072 | ZnS |
| 6 | SPHERICAL SURFACE | -45.1176 | 1.0000 | 13.8832 | |
| 7 | ASPHERIC SURFACE | 26.0934 | 4.0000 | 14.8270 | ZnS |
| 8 | DIFFRACTION SPHERICAL SURFACE | 59.9954 | 22.0263 | 14.4712 | |
| 9 | SPHERICAL SURFACE | INFINITE | 0.6350 | 5.3435 | Ge |
| 10 | SPHERICAL SURFACE | INFINITE | 0.5973 | 5.2780 | |
| IMAGE | SPHERICAL SURFACE | INFINITE | 0.0000 | 5.0000 | |

FIG. 42

| SURFACE NUMBER | K | A | B | C | D |
|---|---|---|---|---|---|
| FIRST SURFACE | -0.139158 | 0.118327E-05 | 0.174344E-08 | 0.240352E-10 | -0.32224TE-13 |
| FOURTH SURFACE | -2828.841420 | 0.567948E-05 | 0.433243E-07 | -0.314124E-09 | 0.487205E-12 |
| SEVENTH SURFACE | -0.016307 | -0.244641E-06 | 0.471996E-08 | -0.559215E-10 | 0.975207E-13 |

| SURFACE NUMBER | C1 | C2 | C3 | C4 | C5 |
|---|---|---|---|---|---|
| SECOND SURFACE | -1.3424E-03 | 1.3990E-06 | -2.5545E-09 | 5.6176E-11 | -2.9168E-13 |
| FOURTH SURFACE | 1.9478E-03 | 4.6104E-06 | -9.5014E-08 | 4.9942E-10 | -5.0700E-13 |
| EIGHTH SURFACE | 3.2717E-03 | -2.3073E-06 | 7.1150E-09 | -8.3201E-12 | |

FIG. 45

| SURFACE NUMBER | SURFACE TYPE | CURVATURE RADIUS | SURFACE SPACING | APERTURE RADIUS | MATERIAL |
|---|---|---|---|---|---|
| 1 | ASPHERIC SURFACE | 16.6154 | 3.5000 | 8.9632 | ZnS |
| 2 | DIFFRACTION SPHERICAL SURFACE | 49.4267 | 0.7110 | 8.3130 | |
| 3 | SPHERICAL SURFACE | -17.7333 | 2.1480 | 6.9823 | ZnS |
| 4 | DIFFRACTION ASPHERIC SURFACE | 13.4336 | 2.4965 | 7.1744 | |
| 5 | SPHERICAL SURFACE | 28.0221 | 2.5000 | 10.1881 | ZnS |
| 6 | SPHERICAL SURFACE | 243.4763 | 1.0000 | 10.2560 | |
| 7 | ASPHERIC SURFACE | 23.7669 | 4.0000 | 10.6779 | ZnS |
| 8 | DIFFRACTION SPHERICAL SURFACE | -26.8538 | 13.0175 | 10.7900 | |
| 9 | SPHERICAL SURFACE | INFINITE | 0.6350 | 5.2953 | Ge |
| 10 | SPHERICAL SURFACE | INFINITE | 0.5973 | 5.2414 | |
| IMAGE | SPHERICAL SURFACE | INFINITE | 0.0000 | 5.0000 | |

FIG. 46

| SURFACE NUMBER | K | A | B | C | D |
|---|---|---|---|---|---|
| FIRST SURFACE | -0.907239 | 0.319966E-04 | -0.520790E-06 | 0.100967E-07 | -0.474496E-10 |
| FOURTH SURFACE | -14.011550 | 0.120941E-03 | -0.230213E-05 | 0.196021E-07 | -0.926084E-10 |
| SEVENTH SURFACE | -30.056897 | 0.546138E-04 | -0.152322E-05 | 0.990510E-08 | -0.265729E-10 |

| SURFACE NUMBER | C1 | C2 | C3 | C4 | C5 |
|---|---|---|---|---|---|
| SECOND SURFACE | 6.7036E-04 | -2.7976E-05 | 1.5310E-06 | -2.4480E-08 | 1.4557E-10 |
| FOURTH SURFACE | -4.5865E-03 | 2.2446E-04 | -3.8296E-06 | 4.182E-08 | -1.7741E-10 |
| EIGHTH SURFACE | 1.9035E-03 | 3.3653E-05 | -1.0412E-07 | -1.0979E-10 | |

FIG. 49

| SURFACE NUMBER | SURFACE TYPE | CURVATURE RADIUS | SURFACE SPACING | APERTURE RADIUS | MATERIAL |
|---|---|---|---|---|---|
| 1 | ASPHERIC SURFACE | 16.0506 | 3.4500 | 14.3537 | ZnS |
| 2 | DIFFRACTION SPHERICAL SURFACE | 15.6966 | 6.7655 | 12.9064 | |
| 3 | SPHERICAL SURFACE | -76.8038 | 2.9000 | 11.0537 | ZnS |
| 4 | DIFFRACTION ASPHERIC SURFACE | 228.4726 | 16.1099 | 11.1764 | |
| 5 | SPHERICAL SURFACE | -56.8874 | 2.8052 | 13.8513 | ZnS |
| 6 | SPHERICAL SURFACE | -31.2532 | 1.0000 | 14.2100 | |
| 7 | ASPHERIC SURFACE | 19.8123 | 4.8000 | 15.6518 | ZnS |
| 8 | DIFFRACTION SPHERICAL SURFACE | 32.5665 | 18.9439 | 15.0808 | |
| 9 | SPHERICAL SURFACE | INFINITE | 0.6350 | 5.4533 | Ge |
| 10 | SPHERICAL SURFACE | INFINITE | 0.5973 | 5.3678 | |
| IMAGE | SPHERICAL SURFACE | INFINITE | 0.0000 | 5.0000 | |

FIG. 50

| SURFACE NUMBER | K | A | B | C | D |
|---|---|---|---|---|---|
| FIRST SURFACE | -0.109306 | -0.226358E-05 | 0.135476E-07 | -0.236758E-10 | -0.829574E-13 |
| FOURTH SURFACE | -171.981581 | 0.247885E-05 | 0.577725E-07 | -0.403958E-09 | 0.966672E-12 |
| SEVENTH SURFACE | 0.006876 | -0.116328E-05 | -0.117077E-07 | 0.129953E-10 | -0.960217E-13 |

| SURFACE NUMBER | C1 | C2 | C3 | C4 | C5 |
|---|---|---|---|---|---|
| SECOND SURFACE | 1.1850E-03 | 4.1717E-06 | -4.7874E-08 | 2.1384E-10 | -1.8984E-13 |
| FOURTH SURFACE | -1.9031E-03 | -5.0853E-06 | 8.2794E-08 | -5.6953E-10 | 7.6841E-13 |
| EIGHTH SURFACE | -3.8228E-03 | 2.4207E-06 | -1.4694E-08 | 3.4965E-11 | |

[COMPARISON EXAMPLE 1]

| f1/ft | | fw | | f1 | | FVALUE |
|---|---|---|---|---|---|---|
| 0.954 | | 15 | | 18.6 | | 1.1 |
| position1 | | 0° | | 11.54° | | 19.75° |
| 12 μm | Sagittal | 0.423 | | 0.526 | | 0.272 |
| | Tangential | 0.423 | | 0.293 | | 0.401 |
| 10 μm | Sagittal | 0.335 | | 0.340 | | 0.602 |
| | Tangential | 0.335 | | 0.573 | | 0.359 |
| 8 μm | Sagittal | 0.381 | | 0.543 | | 0.037 |
| | Tangential | 0.381 | | 0.304 | | 0.260 |
| position2 | | 0° | | 8.74° | | 14.49° |
| 12 μm | Sagittal | 0.189 | | 0.451 | | 0.400 |
| | Tangential | 0.189 | | 0.536 | | 0.105 |
| 10 μm | Sagittal | 0.652 | | 0.379 | | 0.293 |
| | Tangential | 0.652 | | 0.321 | | 0.441 |
| 8 μm | Sagittal | 0.264 | | 0.213 | | 0.270 |
| | Tangential | 0.264 | | 0.156 | | 0.326 |

(b)

[EXAMPLE 2]

| f1/ft | | fw | | f1 | | FVALUE |
|---|---|---|---|---|---|---|
| 0.986 | | 15 | | 19.22 | | 1.1 |
| position1 | | 0° | | 11.54° | | 19.77° |
| 12 μm | Sagittal | 0.494 | | 0.564 | | 0.347 |
| | Tangential | 0.494 | | 0.273 | | 0.461 |
| 10 μm | Sagittal | 0.322 | | 0.311 | | 0.628 |
| | Tangential | 0.322 | | 0.602 | | 0.411 |
| 8 μm | Sagittal | 0.480 | | 0.593 | | 0.182 |
| | Tangential | 0.480 | | 0.338 | | 0.306 |
| position2 | | 0° | | 8.75° | | 14.50° |
| 12 μm | Sagittal | 0.230 | | 0.492 | | 0.469 |
| | Tangential | 0.230 | | 0.540 | | 0.164 |
| 10 μm | Sagittal | 0.675 | | 0.411 | | 0.226 |
| | Tangential | 0.675 | | 0.388 | | 0.469 |
| 8 μm | Sagittal | 0.236 | | 0.334 | | 0.429 |
| | Tangential | 0.236 | | 0.252 | | 0.389 |

[EXAMPLE 1]

| f1/ft | ft | fw | f1 | FVALUE |
|---|---|---|---|---|
| 1.672 | 26 | 20 | 43.46 | 1.1 |

| position1 | | 0° | 8.71° | 14.97° |
|---|---|---|---|---|
| 12 μm | Sagittal | 0.290 | 0.423 | 0.405 |
| | Tangential | 0.290 | 0.204 | 0.339 |
| 10 μm | Sagittal | 0.442 | 0.260 | 0.267 |
| | Tangential | 0.442 | 0.568 | 0.444 |
| 8 μm | Sagittal | 0.769 | 0.735 | 0.758 |
| | Tangential | 0.769 | 0.604 | 0.376 |

| position2 | | 0° | 6.64° | 11.19° |
|---|---|---|---|---|
| 12 μm | Sagittal | 0.324 | 0.490 | 0.543 |
| | Tangential | 0.324 | 0.407 | 0.538 |
| 10 μm | Sagittal | 0.648 | 0.431 | 0.188 |
| | Tangential | 0.648 | 0.530 | 0.383 |
| 8 μm | Sagittal | 0.241 | 0.454 | 0.581 |
| | Tangential | 0.241 | 0.346 | 0.365 |

(b)

[EXAMPLE 2]

| f1/ft | ft | fw | f1 | FVALUE |
|---|---|---|---|---|
| 3.355 | 32.5 | 25 | 109.05 | 1.1 |

| position1 | | 0° | 6.99° | 12.11° |
|---|---|---|---|---|
| 12 μm | Sagittal | 0.477 | 0.537 | 0.605 |
| | Tangential | 0.477 | 0.108 | 0.601 |
| 10 μm | Sagittal | 0.158 | 0.152 | 0.100 |
| | Tangential | 0.158 | 0.700 | 0.555 |
| 8 μm | Sagittal | 0.570 | 0.616 | 0.657 |
| | Tangential | 0.570 | 0.371 | 0.336 |

| position2 | | 0° | 5.34° | 9.07° |
|---|---|---|---|---|
| 12 μm | Sagittal | 0.359 | 0.444 | 0.507 |
| | Tangential | 0.359 | 0.286 | 0.538 |
| 10 μm | Sagittal | 0.479 | 0.361 | 0.124 |
| | Tangential | 0.479 | 0.649 | 0.360 |
| 8 μm | Sagittal | 0.614 | 0.665 | 0.741 |
| | Tangential | 0.614 | 0.259 | 0.510 |

FIG. 53

[COMPARISON EXAMPLE 2]

| f1/ft | | ft | fw | f1 | F VALUE |
|---|---|---|---|---|---|
| 3.518 | | 32.5 | 25 | 114.33 | 1.1 |
| position1 | | 0° | 6.94° | 11.83° | |
| 12 μm | Sagittal | 0.300 | 0.522 | 0.591 | |
| | Tangential | 0.300 | 0.157 | 0.145 | |
| 10 μm | Sagittal | 0.464 | 0.209 | 0.044 | |
| | Tangential | 0.464 | 0.595 | 0.461 | |
| 8 μm | Sagittal | 0.587 | 0.686 | 0.445 | |
| | Tangential | 0.587 | 0.368 | 0.259 | |
| position2 | | 0° | 5.32° | 8.97° | |
| 12 μm | Sagittal | 0.090 | 0.308 | 0.298 | |
| | Tangential | 0.090 | 0.331 | 0.360 | |
| 10 μm | Sagittal | 0.688 | 0.442 | 0.130 | |
| | Tangential | 0.688 | 0.549 | 0.187 | |
| 8 μm | Sagittal | 0.026 | 0.468 | 0.595 | |
| | Tangential | 0.026 | 0.330 | 0.335 | |

[COMPARISON EXAMPLE 3]

| f2/ft | | ft | fw | f2 | F VALUE |
|---|---|---|---|---|---|
| −0.334 | position1 | 19.5 | 15 | −6.52 | 1.1 |
| | | 0° | 0° | 11.45° | 19.52° |
| 12 μm | Sagittal | 0.511 | 0.511 | 0.491 | 0.407 |
| | Tangential | 0.511 | 0.511 | 0.370 | 0.410 |
| 10 μm | Sagittal | 0.265 | 0.265 | 0.241 | 0.511 |
| | Tangential | 0.265 | 0.265 | 0.541 | 0.288 |
| 8 μm | Sagittal | 0.411 | 0.411 | 0.453 | 0.012 |
| | Tangential | 0.411 | 0.411 | 0.258 | 0.177 |
| | position2 | | | 8.75° | 14.50° |
| 12 μm | Sagittal | 0.121 | 0.121 | 0.191 | 0.384 |
| | Tangential | 0.121 | 0.121 | 0.289 | 0.259 |
| 10 μm | Sagittal | 0.448 | 0.448 | 0.450 | 0.300 |
| | Tangential | 0.448 | 0.448 | 0.366 | 0.397 |
| 8 μm | Sagittal | 0.257 | 0.257 | 0.356 | 0.436 |
| | Tangential | 0.257 | 0.257 | 0.288 | 0.331 |

(b)

[EXAMPLE 4]

| f2/ft | | ft | fw | f2 | F VALUE |
|---|---|---|---|---|---|
| −0.351 | position1 | 19.5 | 15 | −6.84 | 1.1 |
| | | 0° | 0° | 11.56° | 19.83° |
| 12 μm | Sagittal | 0.531 | 0.531 | 0.578 | 0.404 |
| | Tangential | 0.531 | 0.531 | 0.297 | 0.466 |
| 10 μm | Sagittal | 0.392 | 0.392 | 0.270 | 0.488 |
| | Tangential | 0.392 | 0.392 | 0.633 | 0.320 |
| 8 μm | Sagittal | 0.626 | 0.626 | 0.618 | 0.509 |
| | Tangential | 0.626 | 0.626 | 0.441 | 0.240 |
| | position2 | | | 8.77° | 14.57° |
| 12 μm | Sagittal | 0.183 | 0.183 | 0.432 | 0.514 |
| | Tangential | 0.183 | 0.183 | 0.437 | 0.257 |
| 10 μm | Sagittal | 0.697 | 0.697 | 0.444 | 0.159 |
| | Tangential | 0.697 | 0.697 | 0.468 | 0.491 |
| 8 μm | Sagittal | 0.283 | 0.283 | 0.518 | 0.615 |
| | Tangential | 0.283 | 0.283 | 0.435 | 0.340 |

[EXAMPLE 5]

| f2/ft | ft | fw | f2 | F VALUE |
|---|---|---|---|---|
| -1.236 | 31.5 | 22.5 | -38.92 | 1.1 |

| position1 | | 0° | 7.79° | 13.54° |
|---|---|---|---|---|
| 12 μm | Sagittal | 0.307 | 0.413 | 0.493 |
| | Tangential | 0.307 | 0.103 | 0.530 |
| 10 μm | Sagittal | 0.322 | 0.260 | 0.196 |
| | Tangential | 0.322 | 0.703 | 0.521 |
| 8 μm | Sagittal | 0.709 | 0.694 | 0.718 |
| | Tangential | 0.709 | 0.350 | 0.345 |

| position2 | | 0° | 5.50° | 9.34° |
|---|---|---|---|---|
| 12 μm | Sagittal | 0.230 | 0.330 | 0.427 |
| | Tangential | 0.230 | 0.253 | 0.509 |
| 10 μm | Sagittal | 0.600 | 0.492 | 0.314 |
| | Tangential | 0.600 | 0.663 | 0.417 |
| 8 μm | Sagittal | 0.476 | 0.530 | 0.658 |
| | Tangential | 0.476 | 0.173 | 0.431 |

(b)

[COMPARISON EXAMPLE 4]

| f2/ft | ft | fw | f2 | F VALUE |
|---|---|---|---|---|
| -1.276 | 31.5 | 22.5 | -40.2 | 1.1 |

| position1 | | 0° | 7.78° | 13.53° |
|---|---|---|---|---|
| 12 μm | Sagittal | 0.303 | 0.415 | 0.497 |
| | Tangential | 0.303 | 0.099 | 0.504 |
| 10 μm | Sagittal | 0.338 | 0.256 | 0.184 |
| | Tangential | 0.338 | 0.690 | 0.508 |
| 8 μm | Sagittal | 0.706 | 0.672 | 0.694 |
| | Tangential | 0.706 | 0.409 | 0.373 |

| position2 | | 0° | 5.50° | 9.34° |
|---|---|---|---|---|
| 12 μm | Sagittal | 0.228 | 0.332 | 0.435 |
| | Tangential | 0.228 | 0.256 | 0.523 |
| 10 μm | Sagittal | 0.611 | 0.491 | 0.300 |
| | Tangential | 0.611 | 0.656 | 0.398 |
| 8 μm | Sagittal | 0.452 | 0.517 | 0.675 |
| | Tangential | 0.452 | 0.191 | 0.456 |

INFRARED ZOOM LENS AND INFRARED CAMERA

TECHNICAL FIELD

This invention relates to an infrared zoom lens (particularly, far infrared zoom lens) and an infrared camera.

BACKGROUND ART

An infrared zoom lens made up of five lens groups in a related art is disclosed in patent document 1 listed below. An infrared zoom lens made up of three lens groups in a related art is disclosed in patent document 2 listed below. In both the infrared zoom lenses, germanium is used as material.

Patent document 1: Japanese Patent Laid-Open No. 1998-213746

Patent document 2: Japanese Patent Publication of International Application No. 2005-521918

DISCLOSURE OF THE INVENTION

Problems to be Solved by the Invention

However, in the infrared zoom lens in patent document 1 listed above, the number of used lenses is large, the lens system is upsized, it also becomes difficult to miniaturize the whole camera, and expensive germanium is used as material of a plurality of lenses and thus the cost is also increased because of this point.

In the infrared zoom lens in patent document 2, although the number of used lenses is small, germanium is used as material and thus the cost is increased. Germanium of very expensive material is used for all lens systems, producing a bottleneck in cost reduction of not only the lenses, but also the camera.

By the way, zinc sulfide is a low-cost infrared-transparent lens material; it has a characteristic that generally an increase in the light quantity loss caused by thickness increase is large in the far infrared wave range (8 to 12 μm) as compared with germanium (for example, see FIG. 57). It is known that particularly in the wave range of 10 μm or more, the effect of the light quantity loss caused by internal absorption of the material becomes larger than that of the light quantity loss caused by reflection and transmittance is largely degraded. In addition, dispersion is also large and zinc sulfide is hard to handle as lens material in a far infrared region as compared with germanium. In a night vision system and a security camera of main applications, a determination of human being recognition, etc., is made by processing an image provided by an infrared camera and to improve the recognition performance, it becomes necessary to provide an image of a sufficient resolution. Thus, to use zinc sulfide as lens material, the lens thickness needs to be made thin for providing a bright infrared image.

In relation to application to vehicle-installed night vision, usually the illumination range of a head light is 30 m; preferably a pedestrian can be recognized in the range of 30 to 80 m at the night running time. Further, a vehicle is easy to slip on a road surface and the braking distance widens on a rainy day and thus an infrared camera capable of recognizing a more distant view is suited. Thus, as an infrared camera for night vision, an infrared camera capable of picking up a telephotographic image is desired.

On the other hand, at the low-speed running time, if the driver recognizes a pedestrian at a distance and then takes avoidance action, often it is sufficiently in time. To use a telecamera at the low-speed running time, night vision recognizes a pedestrian at a distance more than necessary and erroneous recognition or misoperation of the driver may be incurred. Further, the possibility that a pedestrian may exist beyond the field of view becomes high at the curve running time, etc. Thus, it is desirable that a wide angle camera having a wide image pickup field of view should be used at the low-speed running time.

Thus, the camera for night vision involves the demand for compatibility between telephotographic image pickup and wide angle image pickup. Generally, a zoom function meets the demand and digital zoom or optical zoom can be used as a technique. To install a pedestrian recognition algorithm in the night vision, the optical zoom capable of maintaining brightness and providing a sufficient resolution without degrading the image quality is more desirable.

Therefore, the problem to be solved by the invention is to provide a small-sized and low-cost infrared zoom lens while maintaining the brightness of an image and relevant arts to the infrared zoom lens.

Means for Solving the Problems

To solve the problem described above, in a first aspect of the invention, an infrared zoom lens includes first to third lens groups in order from the object side, at the zooming time, the second lens group is moved in a state in which the first and third lens groups are fixed, and each of the first to third lens groups has at least one lens formed of zinc sulfide.

In a second aspect of the invention, in the infrared zoom lens according to the first aspect of the invention, the first lens group is made up of one or two lenses and has a positive refractive power, the second lens group is made up of one or two lenses and has a negative refractive power, the third lens group is made up of two or more lenses and has a positive refractive power as the whole lens group and also has a positive meniscus lens with a convex face pointed at the object side as a final lens on the image surface side, and all lenses included in the first to third lens groups are formed of zinc sulfide.

In a third aspect of the invention, in the infrared zoom lens according to the first or second aspect of the invention, at least one of the lens surfaces included in the first to third lens groups is a diffraction surface.

In a fourth aspect of the invention, in the infrared zoom lens according to any of the first to third aspects of the invention, at least one of the lens surfaces included in the first and third lens groups is an aspheric surface.

In a fifth aspect of the invention, in the infrared zoom lens according to any of the first to fourth aspects of the invention, the following condition is satisfied:

$$0.97 < f1/ft < 3.40$$

where ft: Focal length of most telephotographic side of whole of first to third lens groups f1: Focal length of first lens group In a sixth aspect of the invention, in the infrared zoom lens according to any of the first to fifth aspects of the invention, the following condition is satisfied:

$$-1.25 < f2/f < -0.34$$

where ft: Focal length of most telephotographic side of whole of first to third lens groups f2: Focal length of second lens group In a seventh aspect of the invention, in the infrared zoom lens according to any of the first to sixth aspects of the invention, outer diameter Rd of every lens included in the first to third lens groups satisfies the following relational expression:

Rd<40 mm.

In an eighth aspect of the invention, in the infrared zoom lens according to any of the first to seventh aspects of the invention, center thickness Tm and edge thickness Te of every lens included in the first to third lens groups satisfy the following relational expressions:

1.5 mm<Tm<8.0 mm 1.0 mm<Te<8.0 mm.

In a ninth aspect of the invention, an infrared camera includes an infrared zoom lens according to any of the first to eighth aspects of the invention and an image pickup device for picking up an image formed through the infrared zoom lens.

ADVANTAGES OF THE INVENTION

According to the invention, the number of lenses is decreased and zinc sulfide is used as all lens materials, whereby miniaturization and cost reduction can be intended and a harmful effect of darkening an image by using zinc sulfide of low light transmittance as the lens material can be suppressed. Consequently, the infrared zoom lens for providing a bright image in the small-sized and low-cost configuration can be provided.

BRIEF DESCRIPTION OF THE DRAWINGS

FIG. 2 is a drawing to show the configuration in telephotography in example 1 of the infrared zoom lens according to the embodiment of the invention.

FIG. 3 is a drawing to show the surface shapes, surface spacings, the aperture radiuses, etc., of lenses in FIG. 1.

FIG. 4 is a drawing to show shape parameters of an aspheric lens and a diffraction lens in FIG. 1.

FIG. 21 is a drawing to show the surface shapes, surface spacings, the aperture radiuses, etc., of lenses in FIG. 19.

FIG. 22 is a drawing to show shape parameters of an aspheric lens and a diffraction lens in FIG. 19.

FIG. 25 is a drawing to show the surface shapes, surface spacings, the aperture radiuses, etc., of lenses in FIG. 23.

FIG. 26 is a drawing to show shape parameters of an aspheric lens and a diffraction lens in FIG. 23.

FIG. 29 is a drawing to show the surface shapes, surface spacings, the aperture radiuses, etc., of lenses in FIG. 27.

FIG. 30 is a drawing to show shape parameters of an aspheric lens and a diffraction lens in FIG. 27.

FIG. 33 is a drawing to show the surface shapes, surface spacings, the aperture radiuses, etc., of lenses in FIG. 31.

FIG. 34 is a drawing to show shape parameters of an aspheric lens and a diffraction lens in FIG. 31.

FIG. 37 is a drawing to show the surface shapes, surface spacings, the aperture radiuses, etc., of lenses in FIG. 35.

FIG. 38 is a drawing to show shape parameters of an aspheric lens and a diffraction lens in FIG. 35.

FIG. 41 is a drawing to show the surface shapes, surface spacings, the aperture radiuses, etc., of lenses in FIG. 39.

FIG. 42 is a drawing to show shape parameters of an aspheric lens and a diffraction lens in FIG. 39.

FIG. 45 is a drawing to show the surface shapes, surface spacings, the aperture radiuses, etc., of lenses in FIG. 43.

FIG. 46 is a drawing to show shape parameters of an aspheric lens and a diffraction lens in FIG. 43.

FIG. 49 is a drawing to show the surface shapes, surface spacings, the aperture radiuses, etc., of lenses in FIG. 47.

FIG. 50 is a drawing to show shape parameters of an aspheric lens and a diffraction lens in FIG. 47.

FIGS. 51 (a) and 51 (b) are drawings to show tables listing the MTF characteristics, etc., of the example and the comparison example concerning condition 1.

FIGS. 52 (a) and 52 (b) are drawings to show tables listing the MTF characteristics, etc., of the example and the comparison example concerning condition 1.

FIG. 53 is a drawing to show a table listing the MTF characteristics, etc., of the example and the comparison example concerning condition 1.

FIGS. 54 (a) and 54 (b) are drawings to show tables listing the MTF characteristics, etc., of the example and the comparison example concerning condition 2.

FIGS. 55 (a) and 55 (b) are drawings to show tables listing the MTF characteristics, etc., of the example and the comparison example concerning condition 2.

Figure 1:
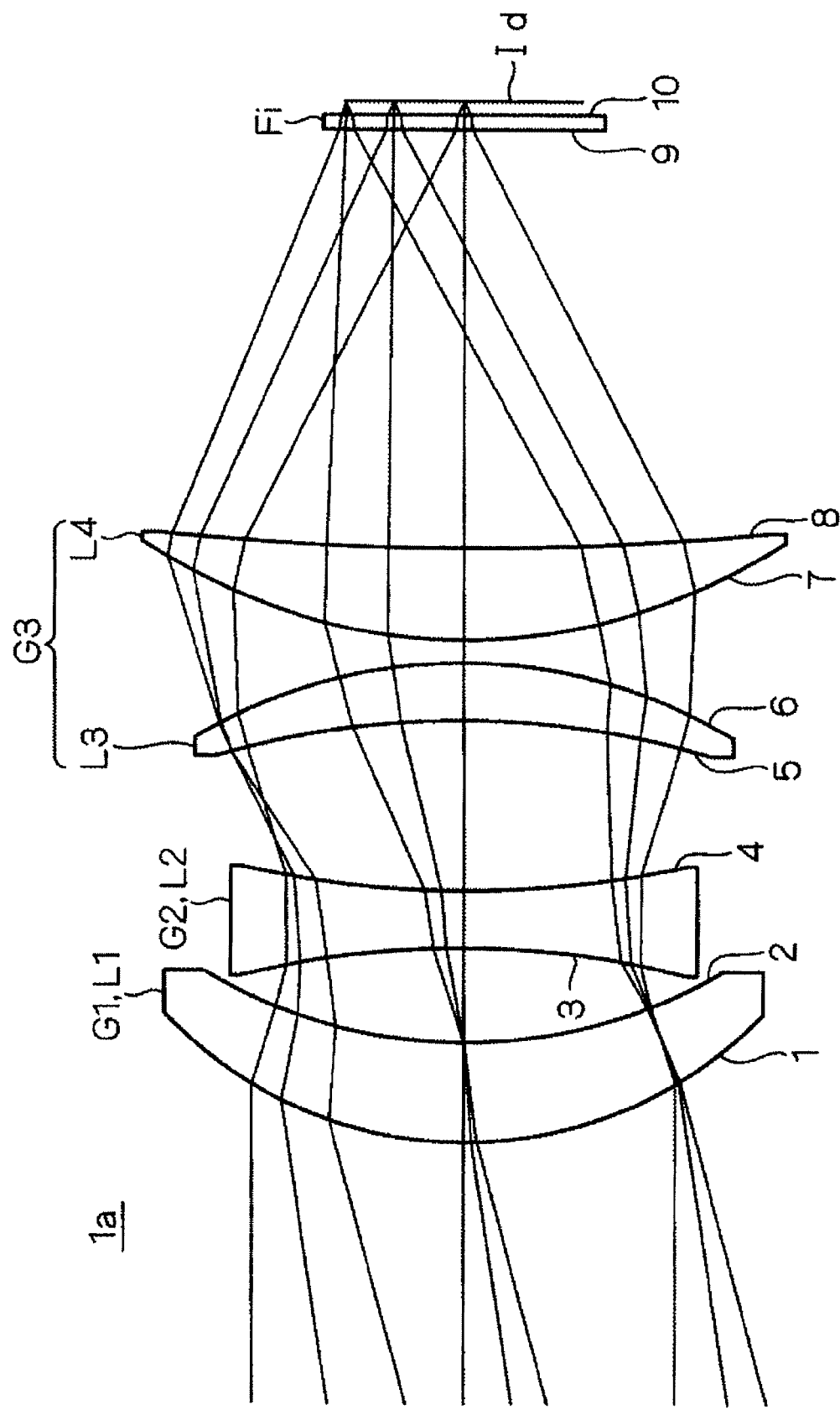
FIG. 1 is a drawing to show the configuration at the wide angle time in example 1 of an infrared zoom lens according to one embodiment of the invention.
Figure 5:
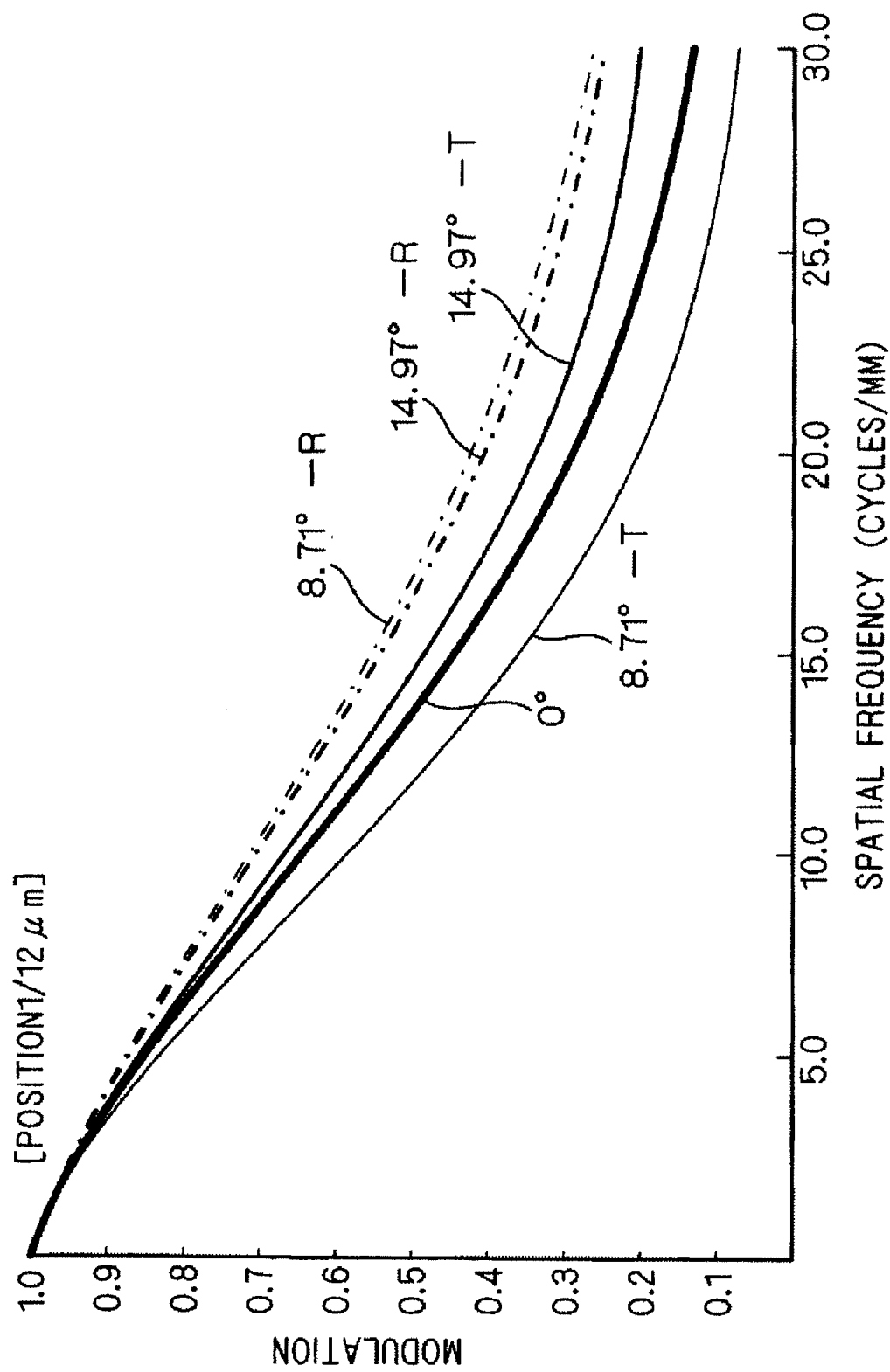
FIG. 5 is a graph to show the MTF characteristic about wavelength 12 μm in the configuration at the wide angle time in FIG. 1.
Figure 6:
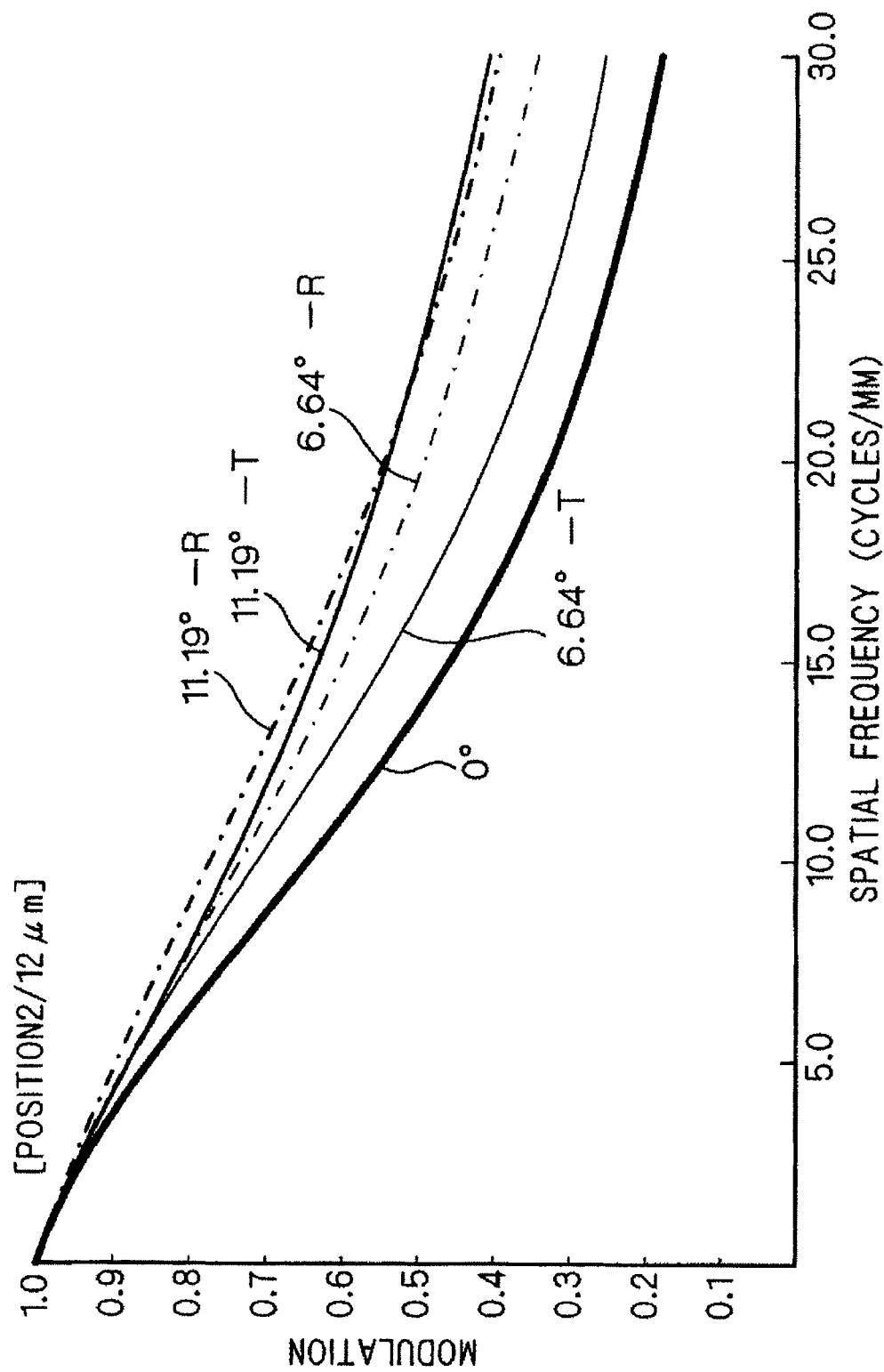
FIG. 6 is a graph to show the MTF characteristic about wavelength 12 μm in the configuration in telephotography in FIG. 2.
Figure 7:
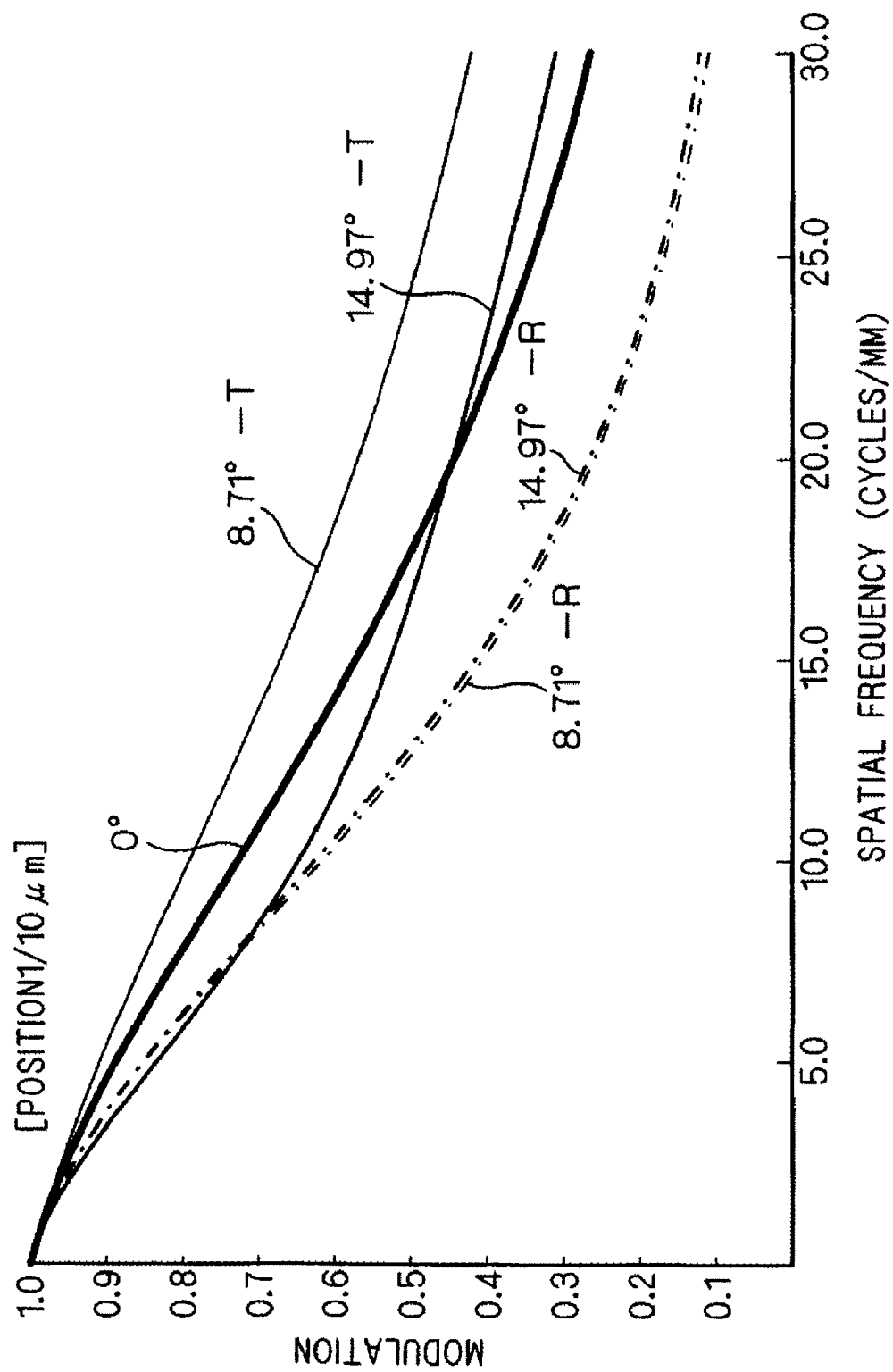
FIG. 7 is a graph to show the MTF characteristic about wavelength 10 μm in the configuration at the wide angle time in FIG. 1.
Figure 8:
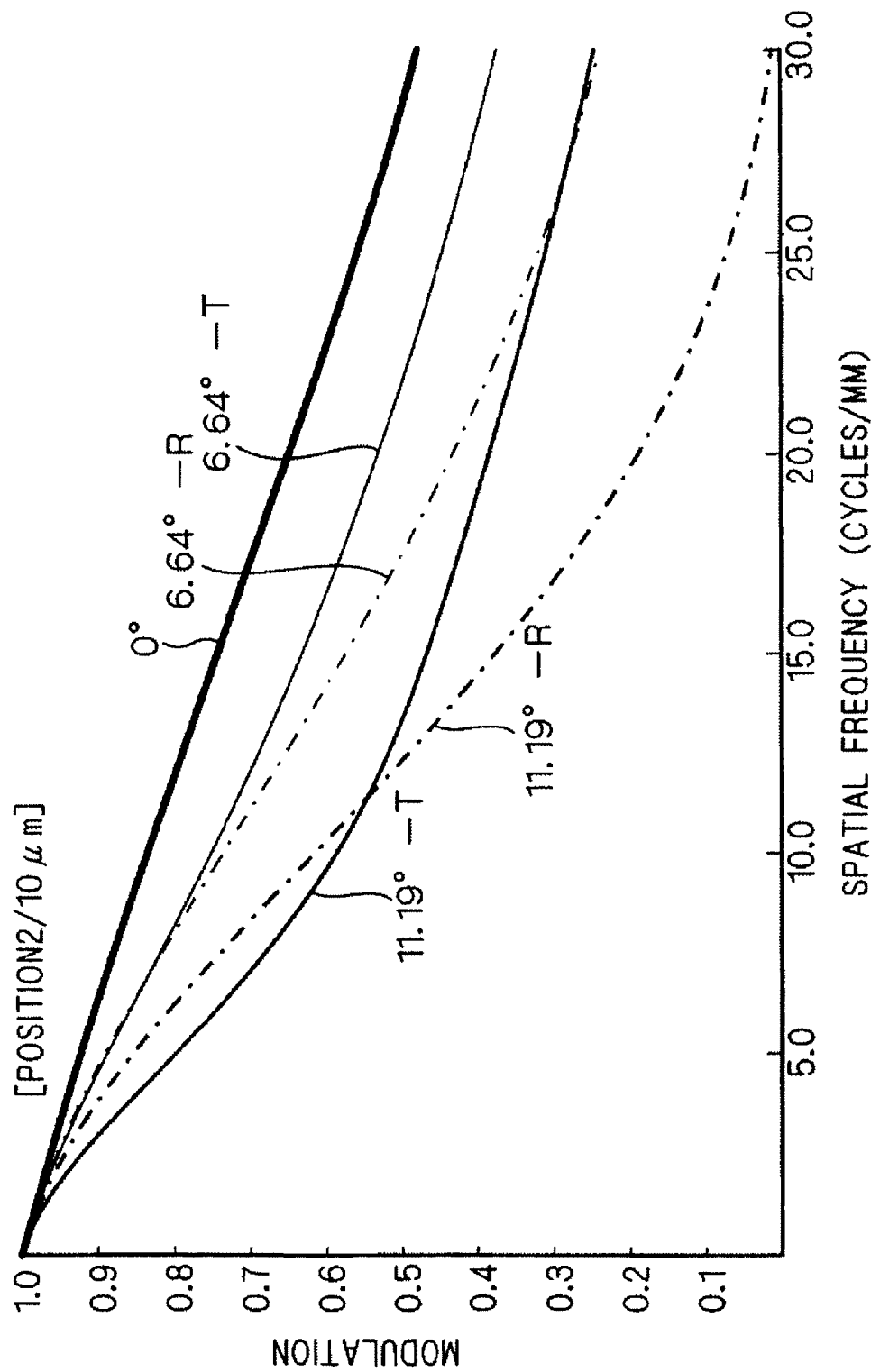
FIG. 8 is a graph to show the MTF characteristic about wavelength 10 μm in the configuration in telephotography in FIG. 2.
Figure 9:
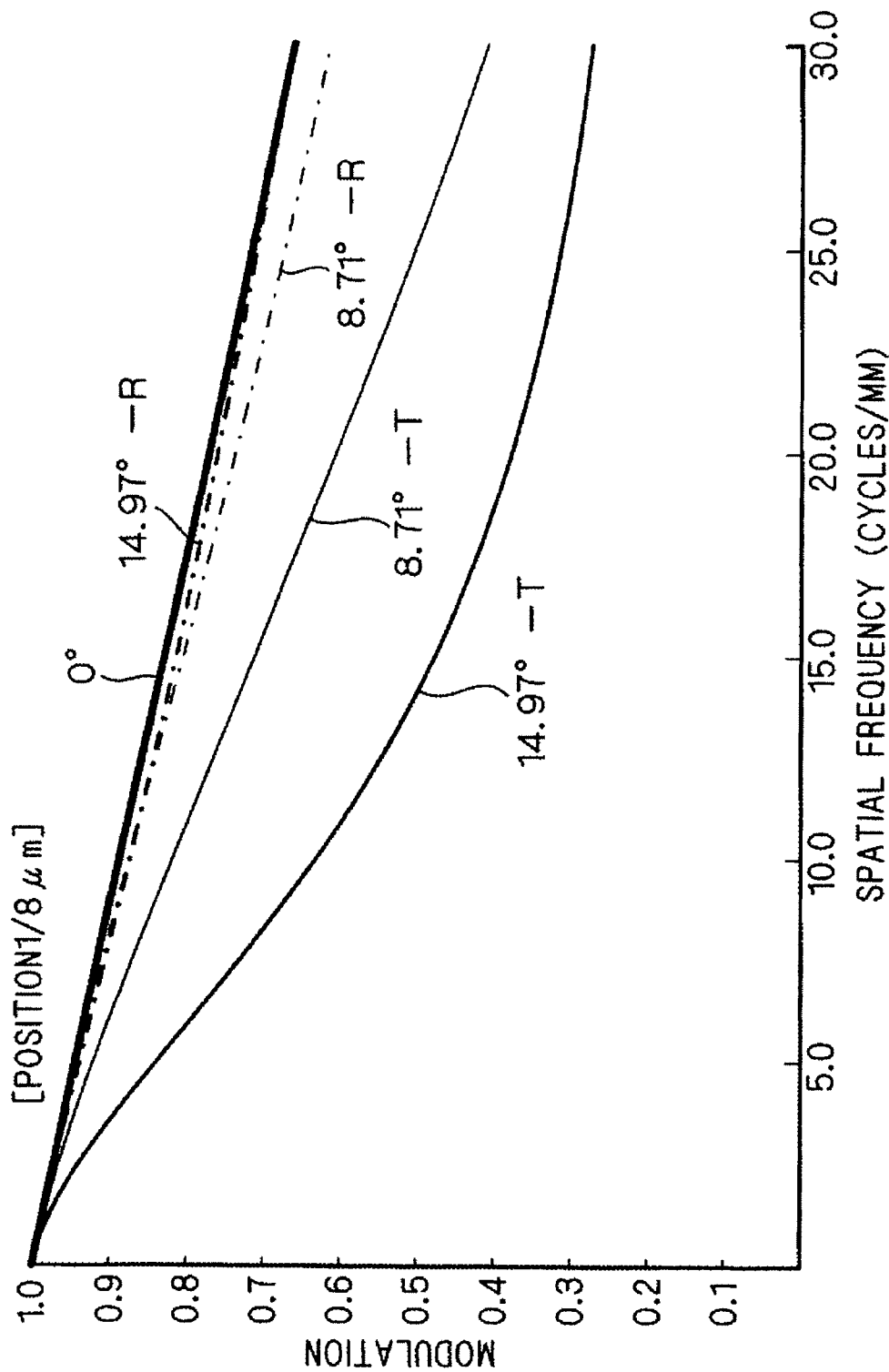
FIG. 9 is a graph to show the MTF characteristic about wavelength 8 μm in the configuration at the wide angle time in FIG. 1.
Figure 10:
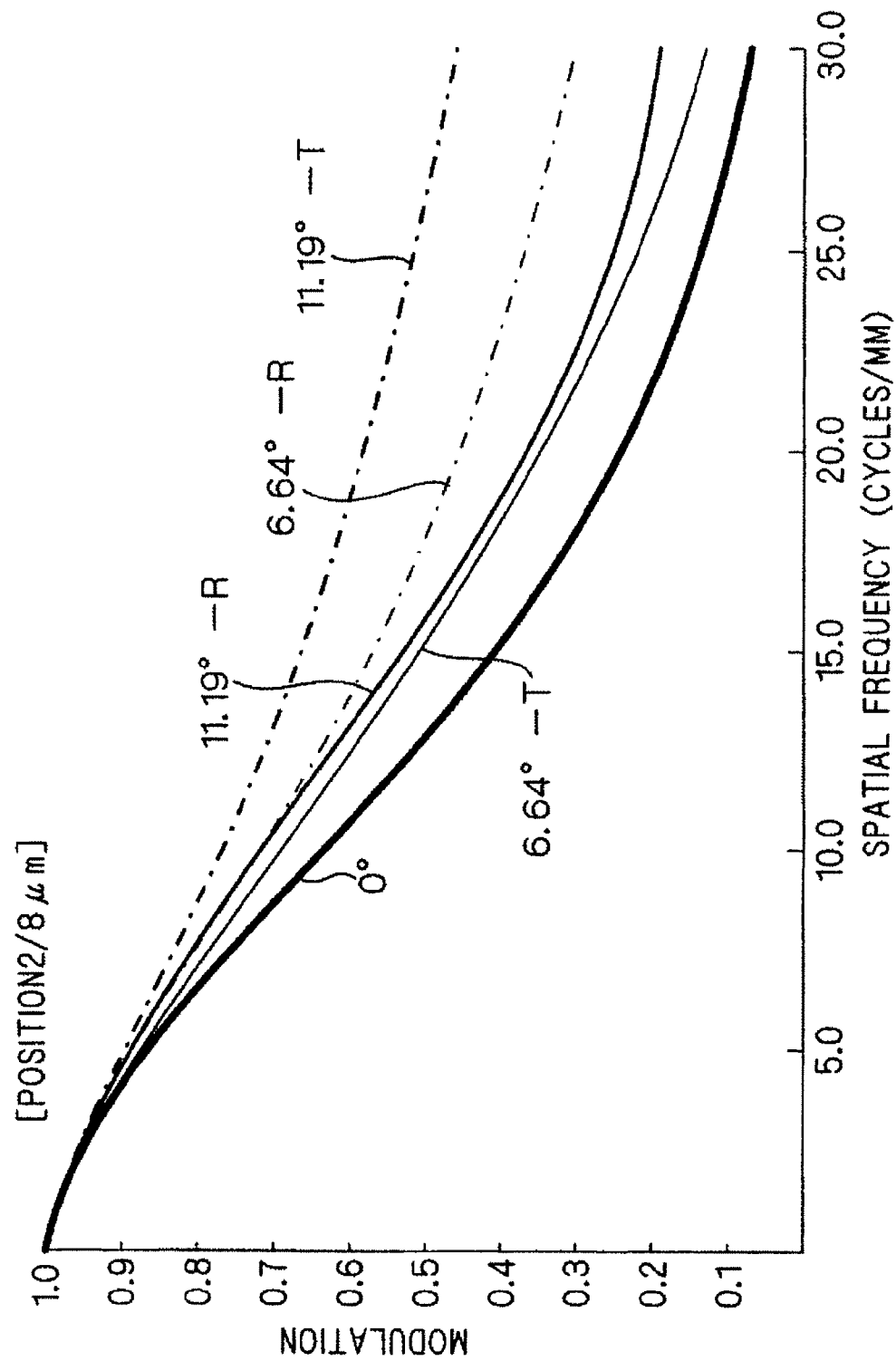
FIG. 10 is a graph to show the MTF characteristic about wavelength 8 μm in the configuration in telephotography in FIG. 2.
Figure 11:
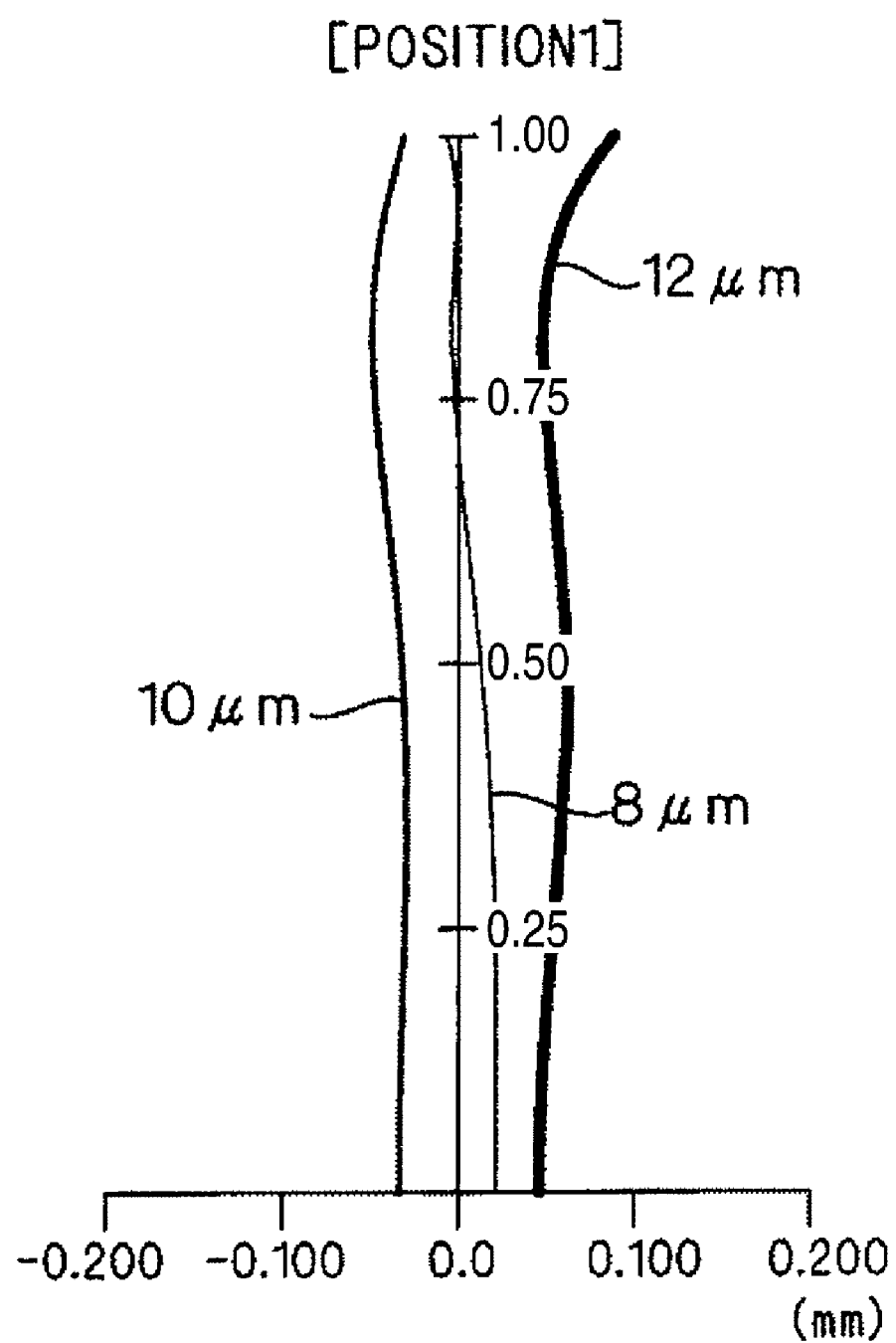
FIG. 11 is a graph to show the spherical aberration characteristic in the configuration at the wide angle time in FIG. 1.
Figure 12:
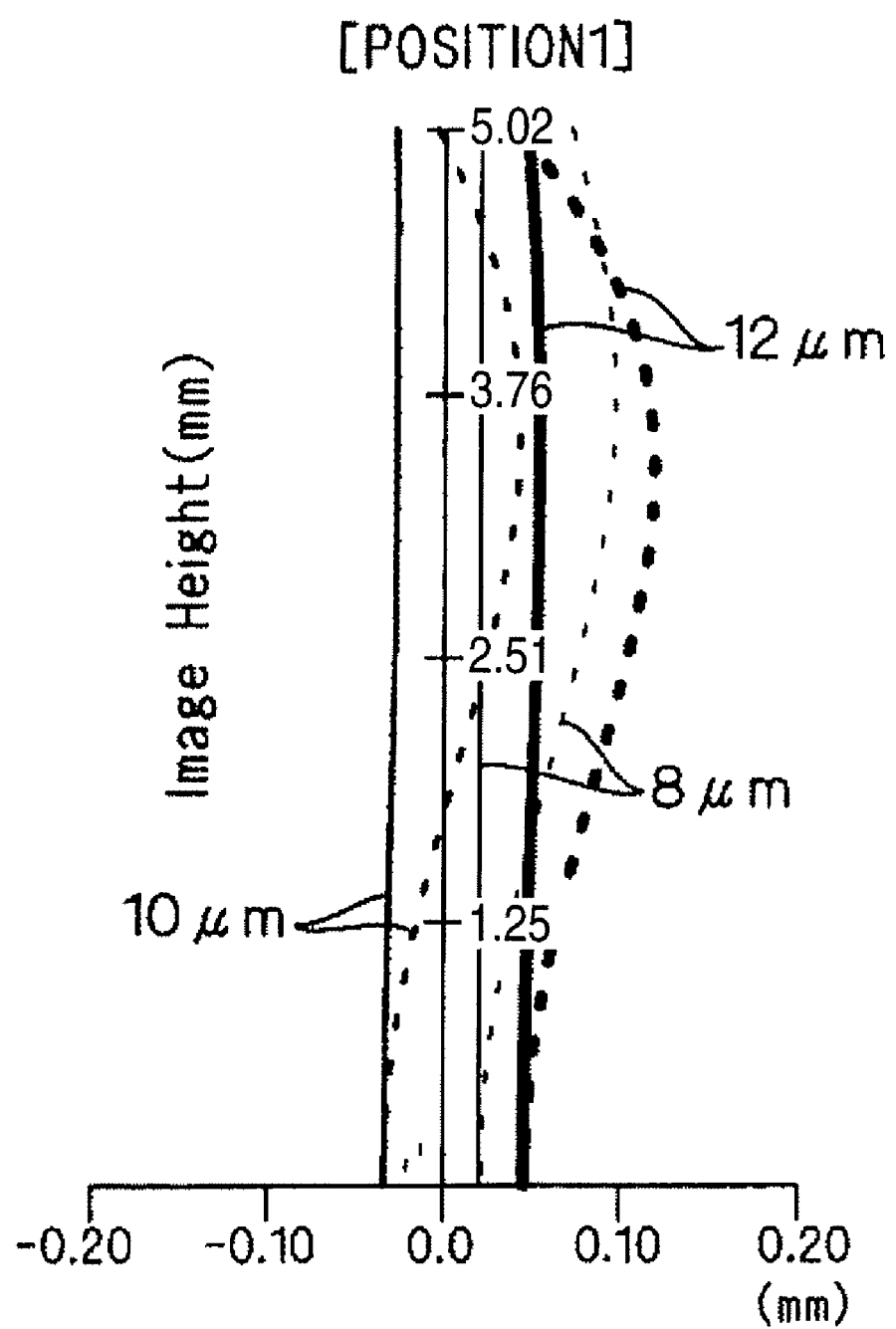
FIG. 12 is a graph to show the astigmatism characteristic in the configuration at the wide angle time in FIG. 1.
Figure 13:
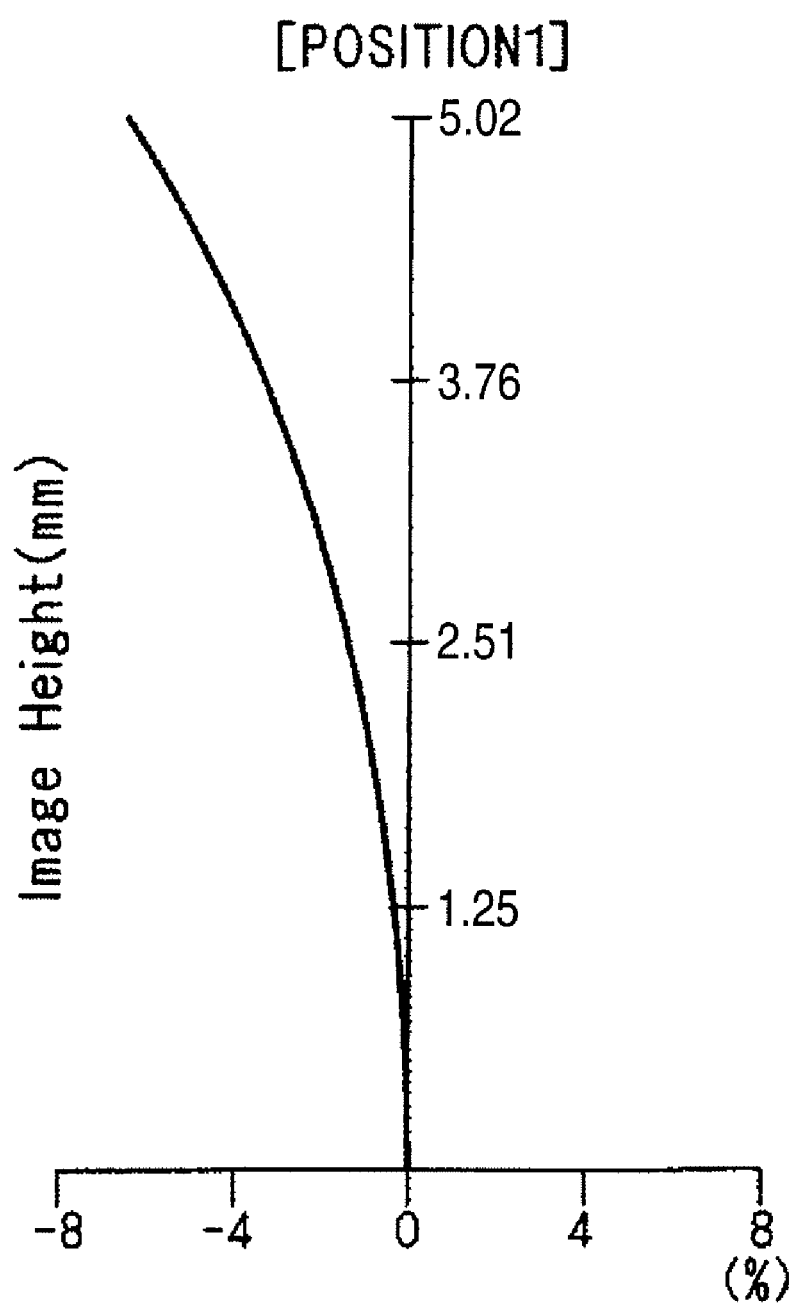
FIG. 13 is a graph to show the distortion characteristic in the configuration at the wide angle time in FIG. 1.
Figure 14:
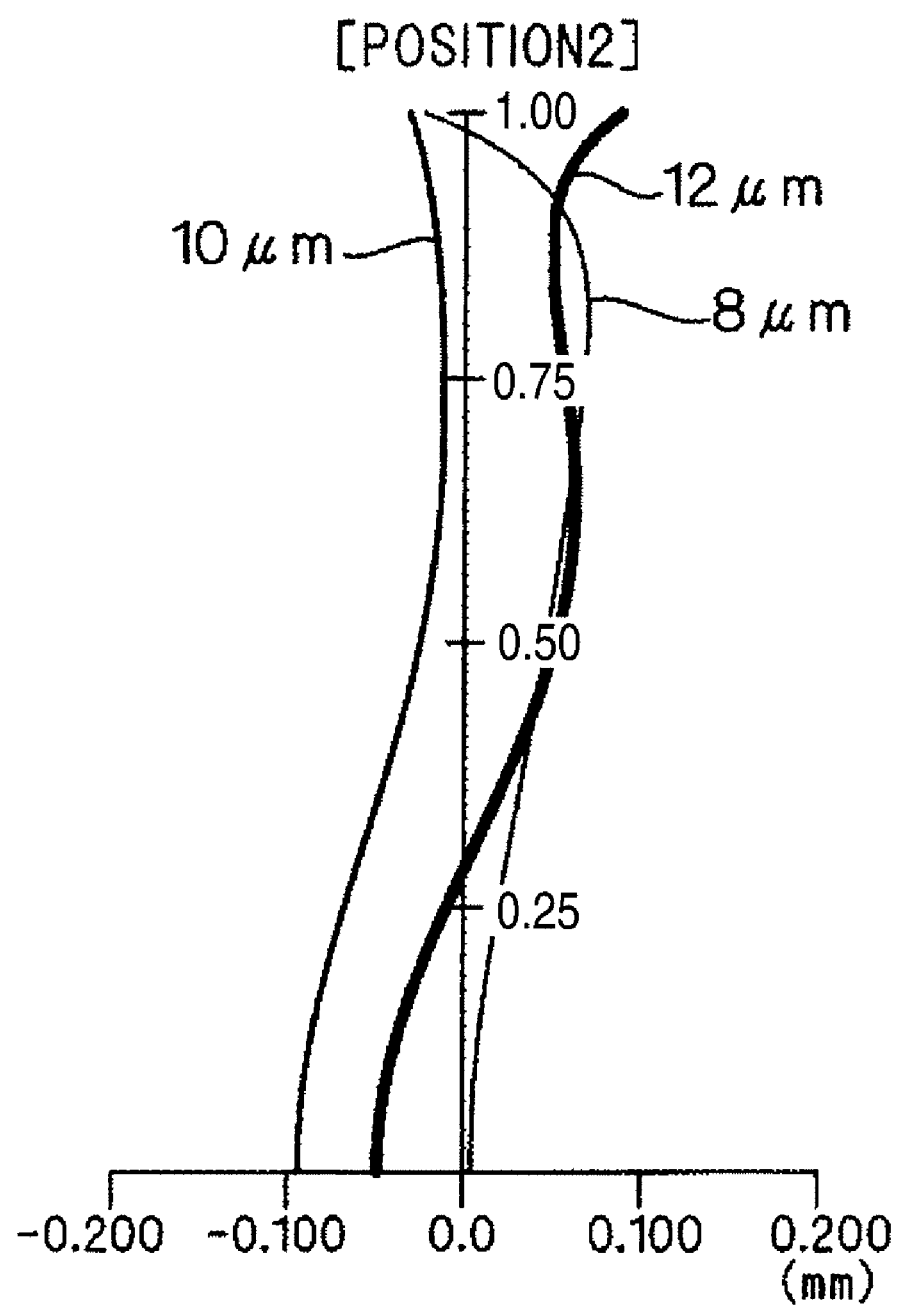
FIG. 14 is a graph to show the spherical aberration characteristic in the configuration in telephotography in FIG. 2.
Figure 15:
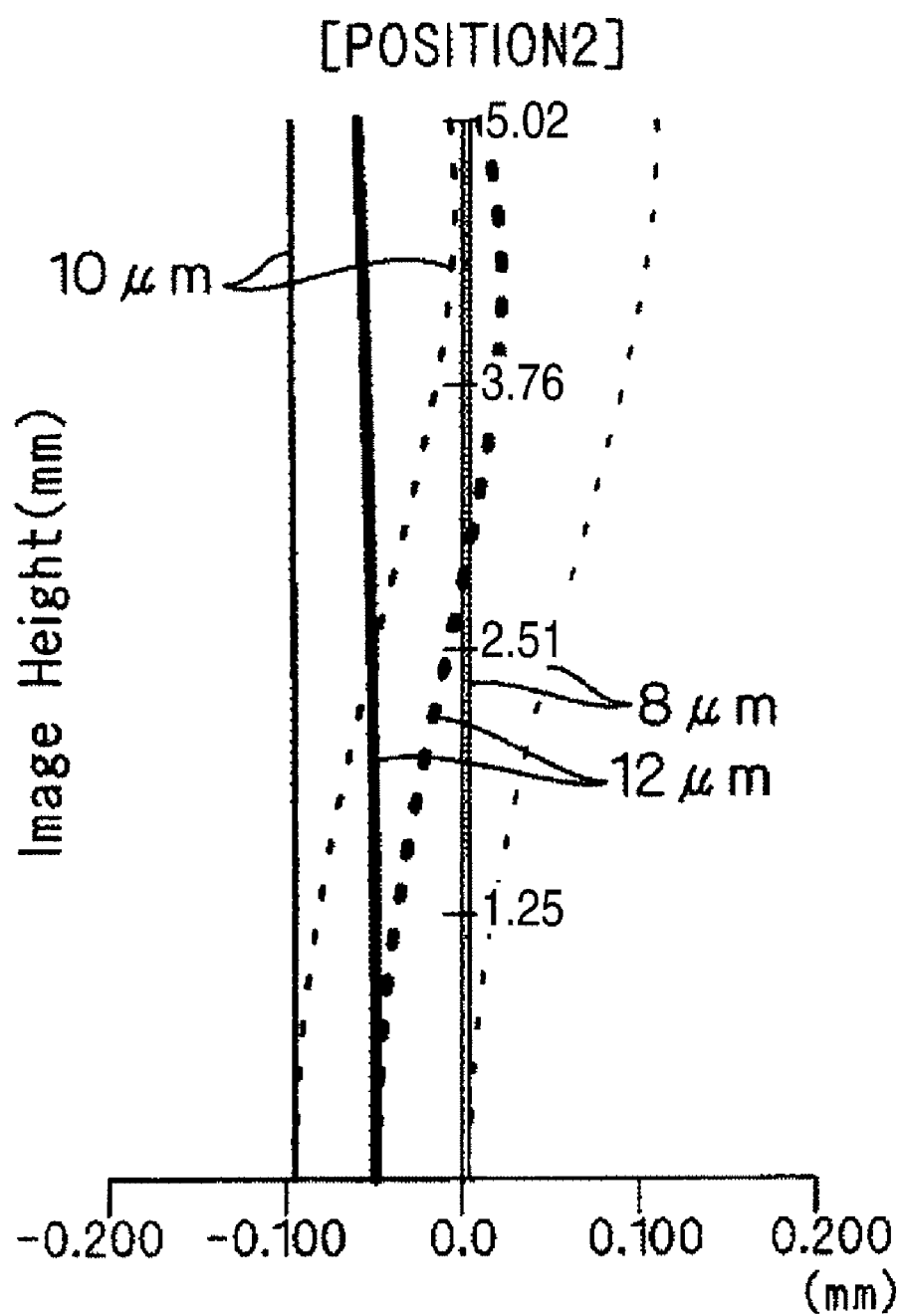
FIG. 15 is a graph to show the astigmatism characteristic in the configuration in telephotography in FIG. 2.
Figure 16:
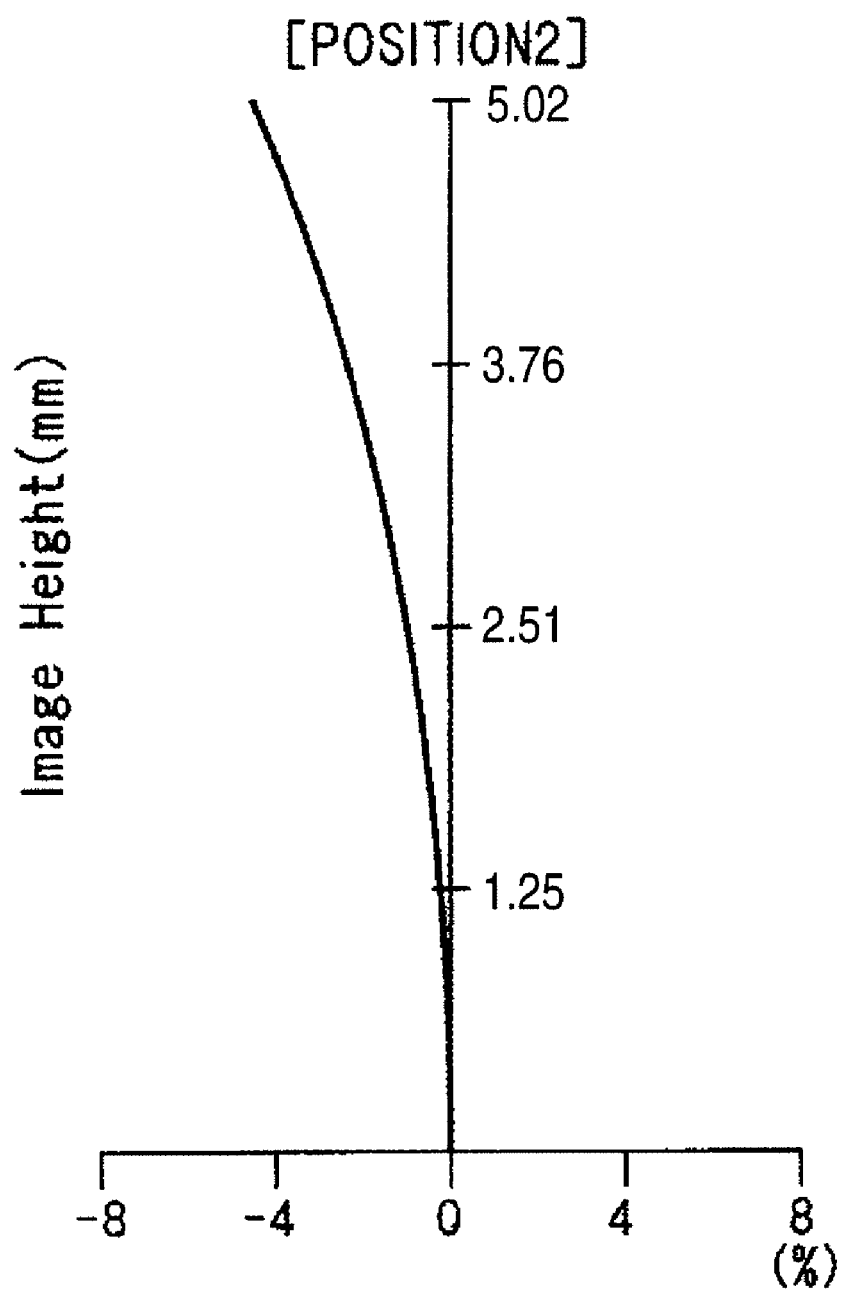
FIG. 16 is a graph to show the distortion characteristic in the configuration in telephotography in FIG. 2.

DESCRIPTION OF REFERENCE NUMERALS 1a-1e Infrared zoom lens
G1 First lens group
G2 Second lens group
G3 Third lens group
L1-L4 Lens
Fi Infrared-transparent window
Id Image pickup device
21 Infrared camera
23 Display section
25 Control section

BEST MODE FOR CARRYING OUT THE INVENTION

Basic Configuration

The basic configuration of an infrared zoom lens according to one embodiment of the invention will be discussed with reference to FIGS. 1 and 2. FIG. 1 shows the configuration at the wide angle time (position 1) and FIG. 2 shows the configuration at the telephotographic time (position 1). Here, only the basic configuration of an infrared zoom lens 1a in FIGS. 1 and 2 will be discussed and the more detailed configuration is described later as example 1.

The infrared zoom lens 1a is made up of first to third lens groups G1 to G3 formed of zinc sulfide in order from the object side as shown in FIGS. 1 and 2. The first lens group G1 is made up of one or two lenses and has a positive refractive power. The second lens group G2 is made up of one or two lenses and has a negative refractive power. The third lens group G3 is made up of two or more lenses and has a positive refractive power as the whole lens group and also includes a positive meniscus lens with a convex face pointed at the object side as a final lens on the image surface side. At the zooming time, the second lens group G2 is moved along the optical axis with the first and third lens groups G1 and G3 fixed. Light (infrared ray) passing through the first to third lens groups G1 to G3 is incident on the light reception surface of an image pickup device Id through an infrared-transparent window Fi and an image is formed on the light reception surface.

Thus, the number of lenses is decreased and zinc sulfide is used as all lens materials, whereby miniaturization and cost reduction can be intended and a harmful effect of darkening an image by using zinc sulfide of low light transmittance as the lens material can be suppressed. Consequently, the infrared zoom lens 1a for providing a bright image in the small-sized and low-cost configuration can be provided.

More specifically, the first lens group G1 is implemented as a positive meniscus lens L1 with a convex face pointed at the object side. The second lens group G2 is implemented as a biconvex lens L2. The third lens group G3 is made up of two lenses L3 and L4. The object side lens L3 is a negative meniscus lens with a convex face pointed at the image side and the image side lens L4 (final lens) is a positive meniscus lens with a convex face pointed at the object side.

At least one of the lens surfaces included in the first to third lens groups G1 to G3 is a diffraction surface, so that chromatic aberration easy to introduce a problem in an infrared-transparent lens can be effectively reduced. For example, in the configurations in FIGS. 1 and 2, the first, fourth, and eighth lens surfaces are diffraction surfaces. The diffraction surface is thus provided on the image side face rather than the object side face of the top lens L1, whereby exposing of the diffraction surface to the external environment and depositing of dust, etc., on the diffraction surface can be prevented. In the example shown in FIGS. 1 and 2, three diffraction surfaces in total are provided, but two diffraction surfaces in total can also be provided as one for chromatic aberration correction at the wide angle zoom position and one for chromatic aberration correction at the telephotographic zoom position.

At least one of the lens surfaces included in the first and third lens groups G1 and G3 is an aspheric surface. Since the lenses L1, L3, and L4 included in the first and third lens groups G1 and G3 have each a large aperture and spherical aberration easily occurs, the aspheric surface is thus used, whereby aberration can be effectively reduced. The lens with a large aperture is provided with the aspheric surface, whereby intensity of shape change of the aspheric surface (swell degree) can be lessened as compared with the case where any other lens is provided with the aspheric surface, and working becomes easy in the points of mold manufacturing and lens working. More specifically, at least one aspheric surface is provided for each of the first to third lens groups G1 to G3 and aberration is reduced for each of the lens groups G1 to G3. For example, in the configurations in FIGS. 1 and 2, the third, fifth, and eighth lens surfaces are aspheric surfaces.

The F value of the infrared zoom lens 1a is set to about 1.1.

The zoom ratio of the infrared zoom lens 1a is set to about 1.4 to 1.5.

Further, to realize predetermined image forming performance, the infrared zoom lens 1a is configured so as to satisfy the following two parameter conditions:

$$0.97 < f1/ft < 3.40 \quad (1)$$

$$-1.25 < f2/ft < -0.34 \quad (2)$$

where ft: Focal length of most telephotographic side of whole of first to third lens groups G1 to G3 f1: Focal length of first lens group G1 f2: Focal length of second lens group G2

These two conditions (1) and (2) are satisfied, whereby while the compact configuration is adopted, sufficient image forming performance (for example, MTF 0.1 or more) can be provided about the full wave range of infrared rays received for picking up an image (for example, 8 to 12 μm) in all regions within the viewing angles at the telephotographic time and the wide angle time of the infrared zoom lens 1a (the detailed description on this point is given later based on examples and comparison examples). Accordingly, for example, the infrared zoom lens 1a can be combined with the image pickup device Id with pixel pitch 25 μm and pixel size 320×240 to provide an infrared image of a high resolution.

The described lenses L1 to L4 are formed as follows: Using a lens-shaped mold, zinc sulfide raw material powder is subjected to hot compression molding in a non-oxidative atmosphere (for example, vacuum, inert gas of Ar, etc., or a combination thereof, etc.), thereby providing the lenses L1 to L4 of polycrystalline zinc sulfide sintered bodies. Thus, the lenses L1 to L4 are manufactured by molding using zinc sulfide, whereby the material cost and the working cost of the infrared zoom lens 1a can be reduced drastically. Machining of polishing, grinding, etc., may be performed for the post-molded lenses L1 to L4.

More particularly, powder with average particle diameter 0.5 to 2 μm and purity 98% or more is used as the zinc sulfide raw material powder. Appropriate conditions of the hot compression molding are temperature 900 to 1100° C. and pressure 150 to 800 kg/cm². The pressure maintenance time is 0.05 to 1.5 hours on an average and is adjusted as required in response to the combination of the temperature and pressure conditions.

To manufacture the infrared zoom lens 1a having predetermined optical performance at a low cost by hot compression molding using a lens-shaped mold, it is necessary to adopt a configuration suited for molding about the configuration of the outer diameters, the thicknesses, etc., of the lenses L1 to L4.

It is also effective to coat each of the polycrystalline zinc sulfide lenses to improve the transmission property or protect the surface from the external effect. The material and the thickness of the coat layer at the time are selected as required considering the use method, the location, and the situation of the infrared zoom lens.

To begin with, for outer diameter Rd of the lens L1 to L4, the larger the outer diameter Rd of the lens L1 to L4, the brighter an image, but as the outer diameter Rd enlarges, the compressive force of a press mechanism required at the hot compression molding time using a lens-shaped mold grows. Thus, from the viewpoint of the working cost, etc., assuming a combination with the image pickup device Id with pixel pitch 25 μm, for example, it is desirable that the outer diameter Rd of the lens L1 to L4 should be set so as to satisfy the following relational expression:

$$Rd < 40 \text{ mm} \quad (3)$$

Accordingly, the compressive force of a press mechanism required at the hot compression molding time using a lens-shaped mold can be suppressed, so that the costs of facilities for lens working can be suppressed.

The thickness of the lens L1 to L4 needs to be a measure of thickness to ensure moldability (machine strength, working accuracy, etc.,) at the hot compression molding time using a lens-shaped mold; on the other hand, as the thickness increases, the light quantity loss at the lens transmission time increases and a compressive force distribution occurs in the thickness direction of the lens L1 to L4 at the hot compression molding time and a refractive index distribution easily occurs in the thickness direction. Thus, assuming a combination with the image pickup device Id with pixel pitch 25 μm, for example, for the thickness of the lens L1 to L4, it is desirable that center thickness Tm and edge thickness Te should be set so as to satisfy the following relational expressions:

$$1.5 \text{ mm} < Tm < 8.0 \text{ mm} \quad (4)$$

$$1.0 \text{ mm} < Te < 8.0 \text{ mm} \quad (5)$$

Accordingly, while moldability at the hot compression molding time using a lens-shaped mold is ensured, the infrared zoom lens 1a having a thin thickness with the suppressed light quantity loss at the lens transmission time can be realized and in addition, the thickness of the lens L1 to L4 is suppressed, whereby it is made possible to prevent occurrence of a compressive force distribution in the lens thickness direction at the hot compression molding time and occurrence of a refractive index distribution in the thickness direction.

As the image pickup device Id, a non-cooling heat type image pickup device of a bolometer, a thermopile, an SOI diode, etc., having sensitivity in an 8 to 12-μm band is used. Usually, the image pickup device Id with the number of pixels 160×120, 320×240 or the like is used; the image pickup device Id with narrow pixel pitch (for example, 25 μm) is used, whereby the infrared zoom lens 1a becomes the maximum diameter 30 mm or so preferred on manufacturing.

EXAMPLES

Five examples 1 to 5 are described below as specific examples of the embodiment: Example 1 corresponds roughly to the center values of parameter conditions (1) and (2) mentioned above, examples 2 and 3 correspond roughly to the boundary value of parameter condition (1), and examples 4 and 5 correspond roughly to the boundary value of parameter condition (2). Comparison examples 1 and 2 corresponding to parameter condition (1) and comparison examples 3 and 4 corresponding to parameter condition (2) are introduced and examples 1 to 5 and comparison examples 1 to 4 are compared.

Example 1

An infrared zoom lens 1a according to example 1 has the configuration shown in FIGS. 1 to 4, f1/ft is set to 1.672, f2/ft is set to −0.597, the F value is set to 1.1, and the viewing angle is set to 40 degrees→22 degrees (however, the viewing angle is a value when the infrared zoom lens is combined with an image pickup device Id with pixel pitch 25 μm and pixel size 320×240). The shapes of the aspheric surface and the diffraction surface shown in FIG. 4 are determined by assigning parameters to the following expressions:

$$Z(y) = \frac{\frac{y^2}{R}}{1 + \sqrt{1 - (1+K)\frac{y^2}{R^2}}} + A \cdot y^4 + B \cdot y^6 + C \cdot y^8 + D \cdot y^{10}$$  [Expression 1]

$$\Phi(y) = \frac{1}{n_A - n_B} \cdot \text{mod}(C_1 \cdot r^2 + C_2 \cdot r^4 + C_3 \cdot r^6 + C_4 \cdot r^8 + C_5 \cdot r^{10}, -\lambda)$$  [Expression 2]

$\lambda$: Reference wavelength
$n_A$: Refractive index of image side face
$n_B$: Refractive index of object side face (and so forth on). In the expressions, Z is the length (mm) of a perpendicular dropped from a point on the aspheric surface to a tangential plane in contact with the apex of the aspheric surface, y is the height (mm) from the optical axis, K is eccentricity, R is paraxial curvature radius, and A, B, C, and D are fourth-order, sixth-order, eighth-order, and tenth-order aspheric surface coefficients. N is refractive index, $\lambda$ is reference wavelength value, and C1 to C5 are diffraction surface coefficients. The surface shape of a diffraction aspheric surface is given by linear combination of expressions 1 and 2 mentioned above.

Sagittal and tangential MTFs for wavelengths 8 μm, 10 μm, and 12 μm within the viewing angle (at wide angle time: 0°, 8.71°, 14.97°/at telephotographic time: 0°, 6.64°, 11.19°) in the configuration in example 1 are characteristics as shown in FIGS. 5 to 10.

Figure 17:
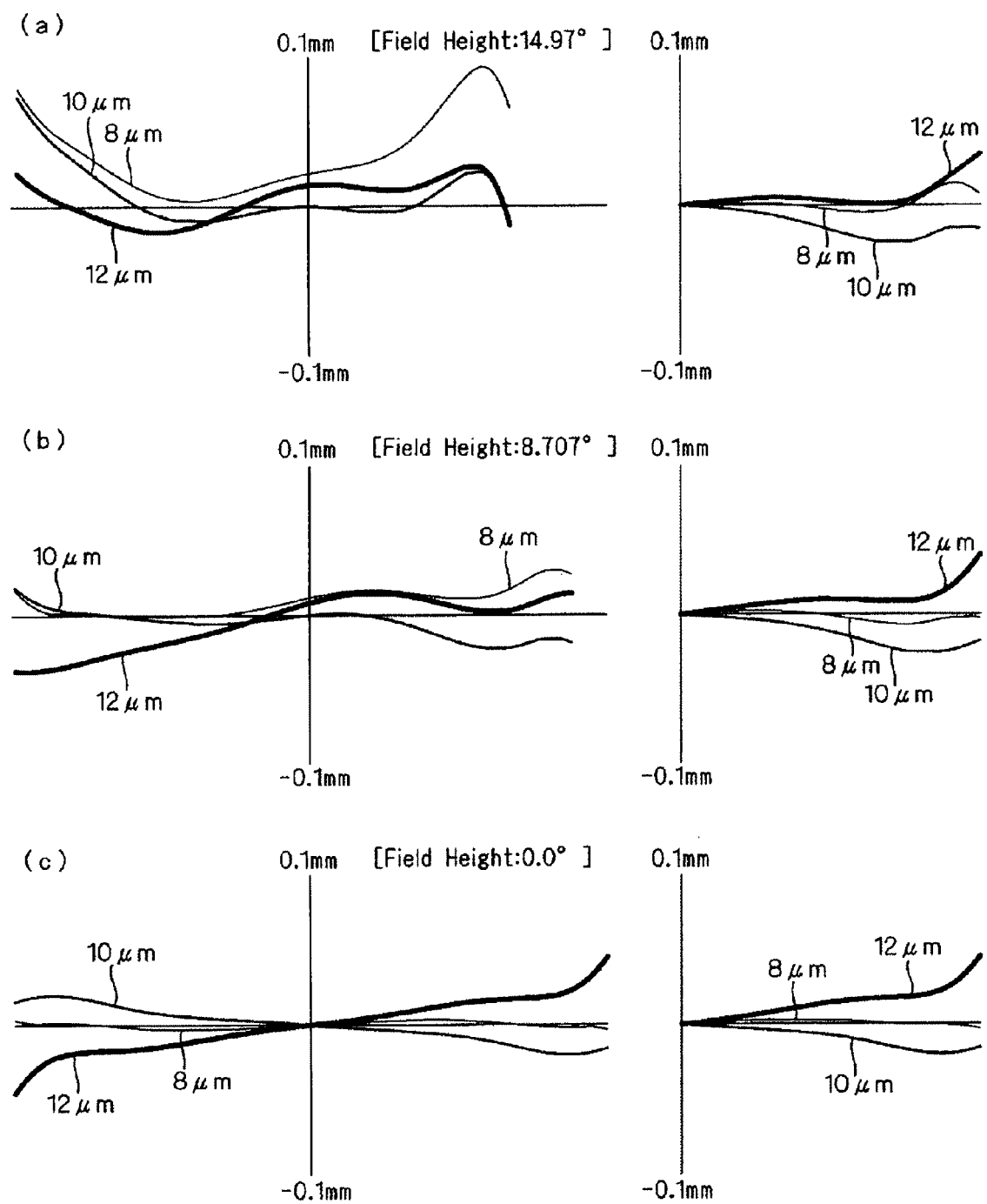
FIGS. 17 (a) to 17 (c) are graphs to show lateral aberration characteristic corresponding to image heights in the configuration at the wide angle time in FIG. 1.
Figure 18:
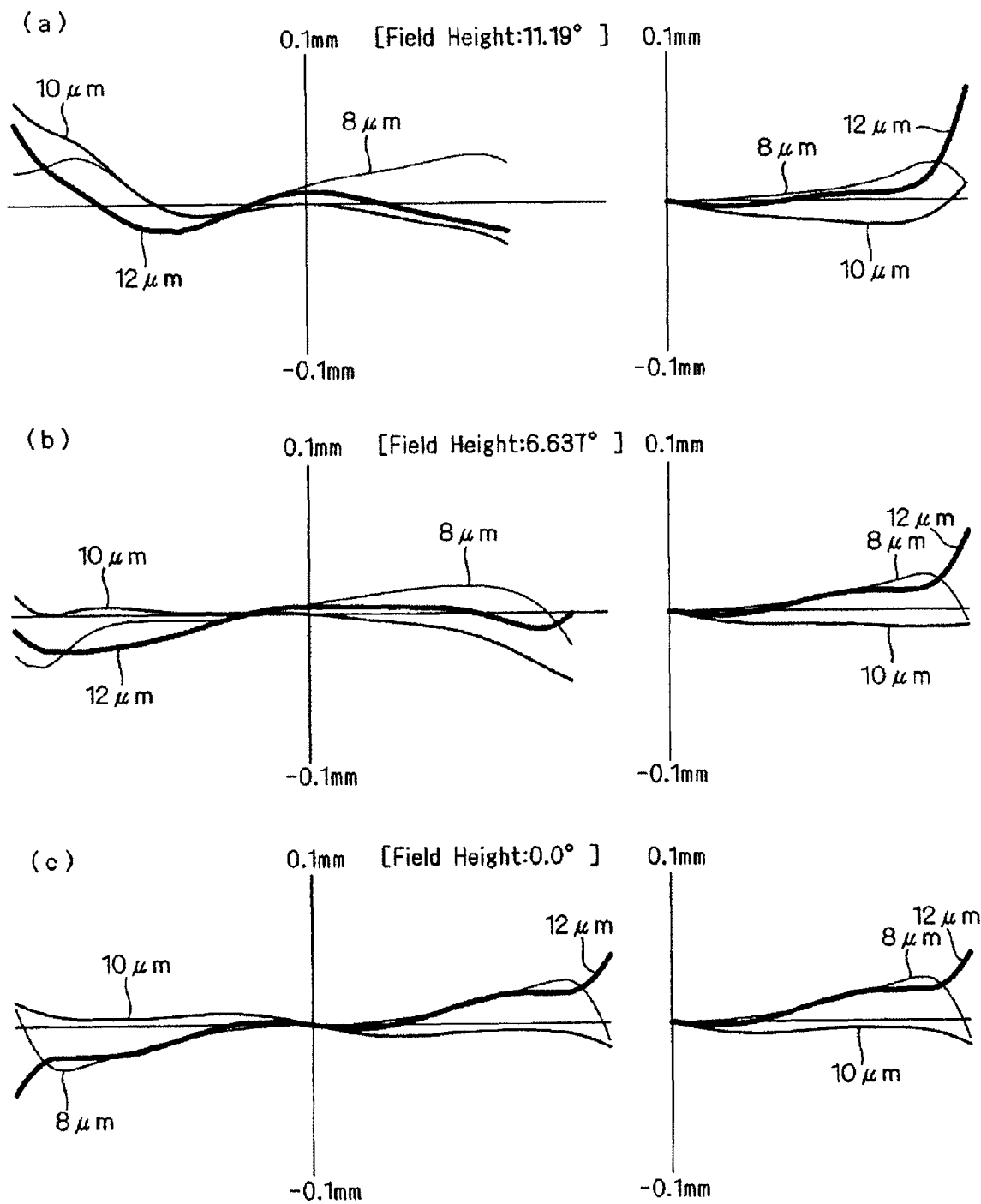
FIGS. 18 (a) to 18 (c) are graphs to show lateral aberration characteristic corresponding to image heights in the configuration in telephotography in FIG. 2.
Figure 19:
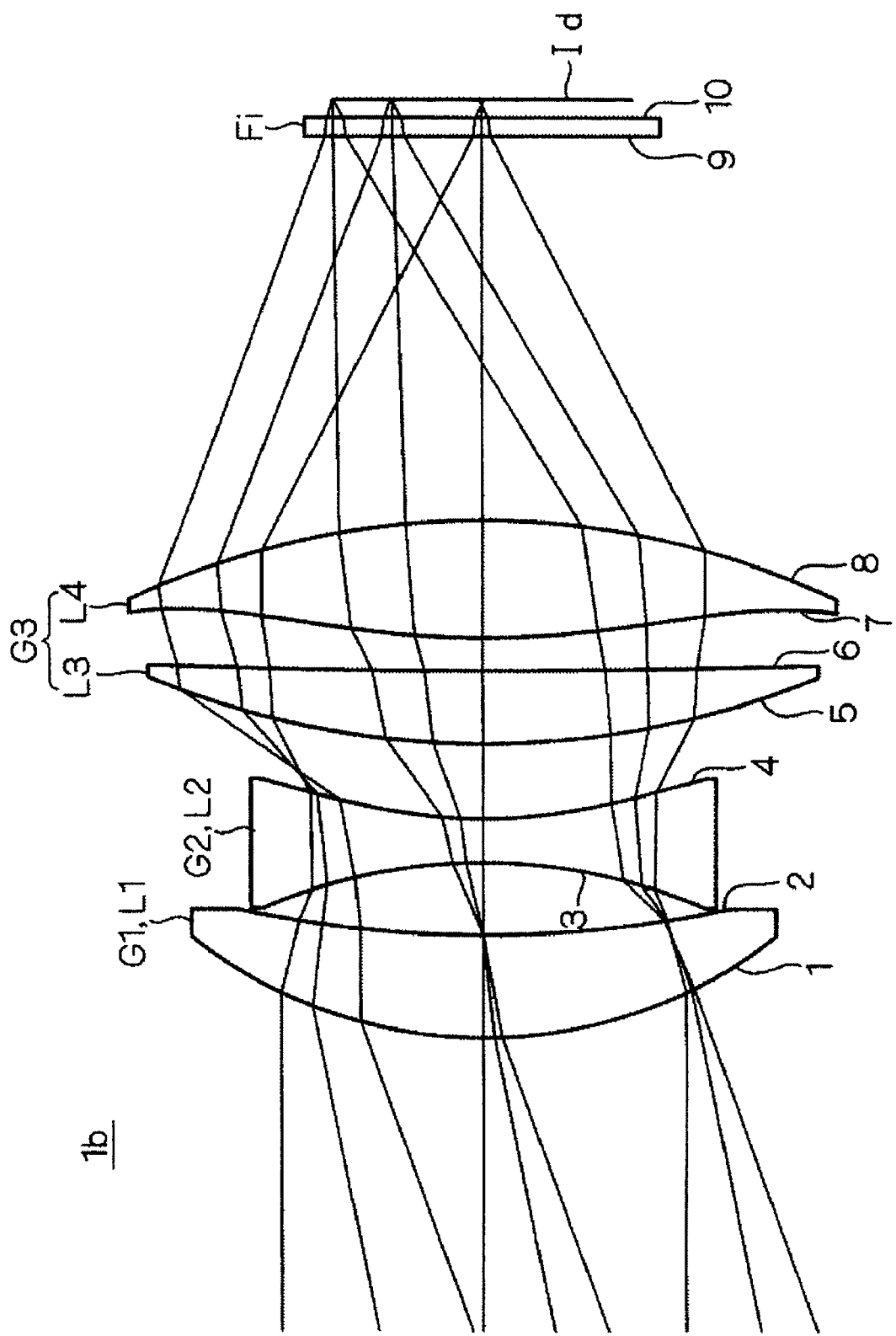
FIG. 19 is a drawing to show the configuration at the wide angle time in example 2 of an infrared zoom lens according to the embodiment of the invention.
Figure 20:
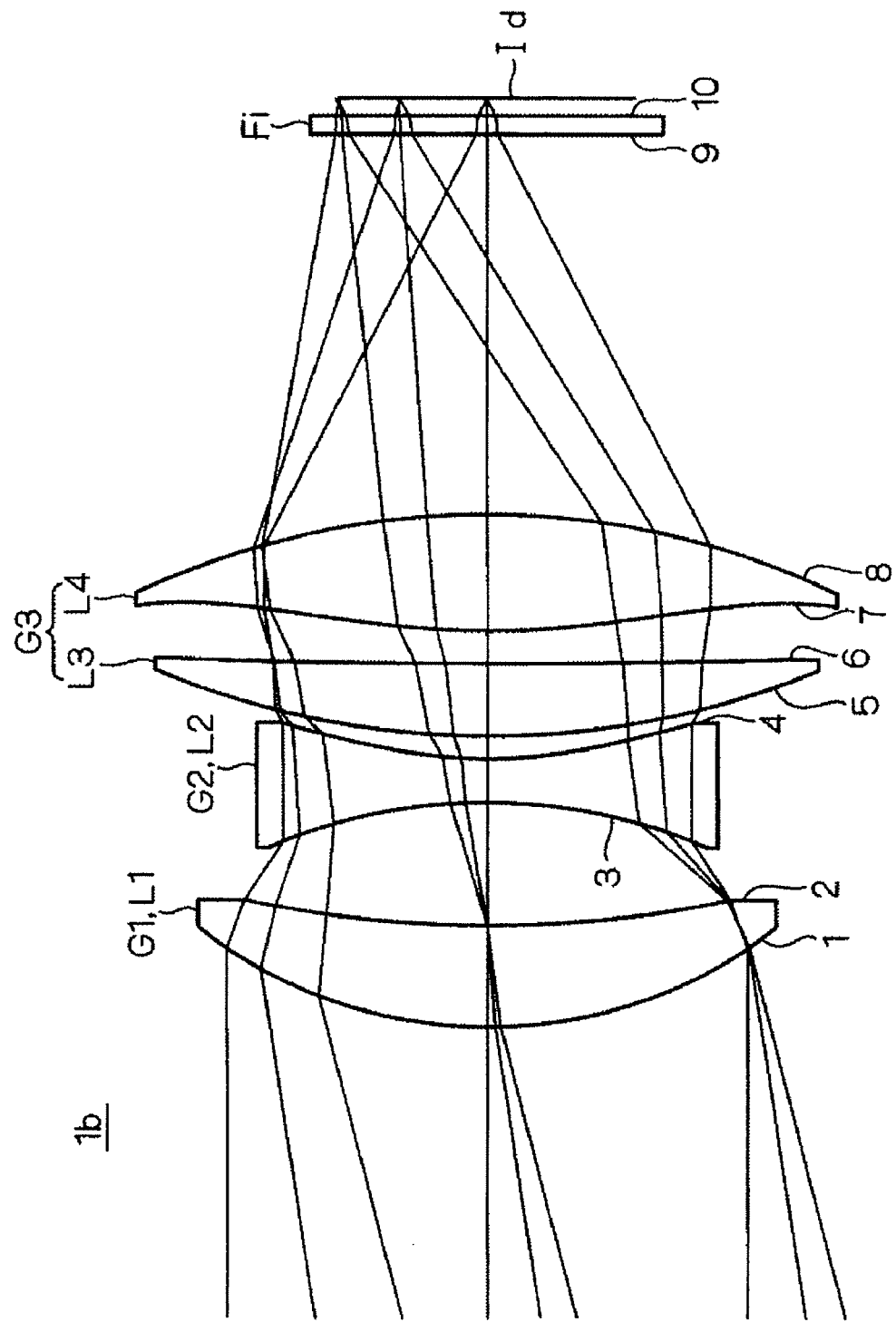
FIG. 20 is a drawing to show the configuration in telephotography in example 2 of the infrared zoom lens according to the embodiment of the invention.
Figure 23:
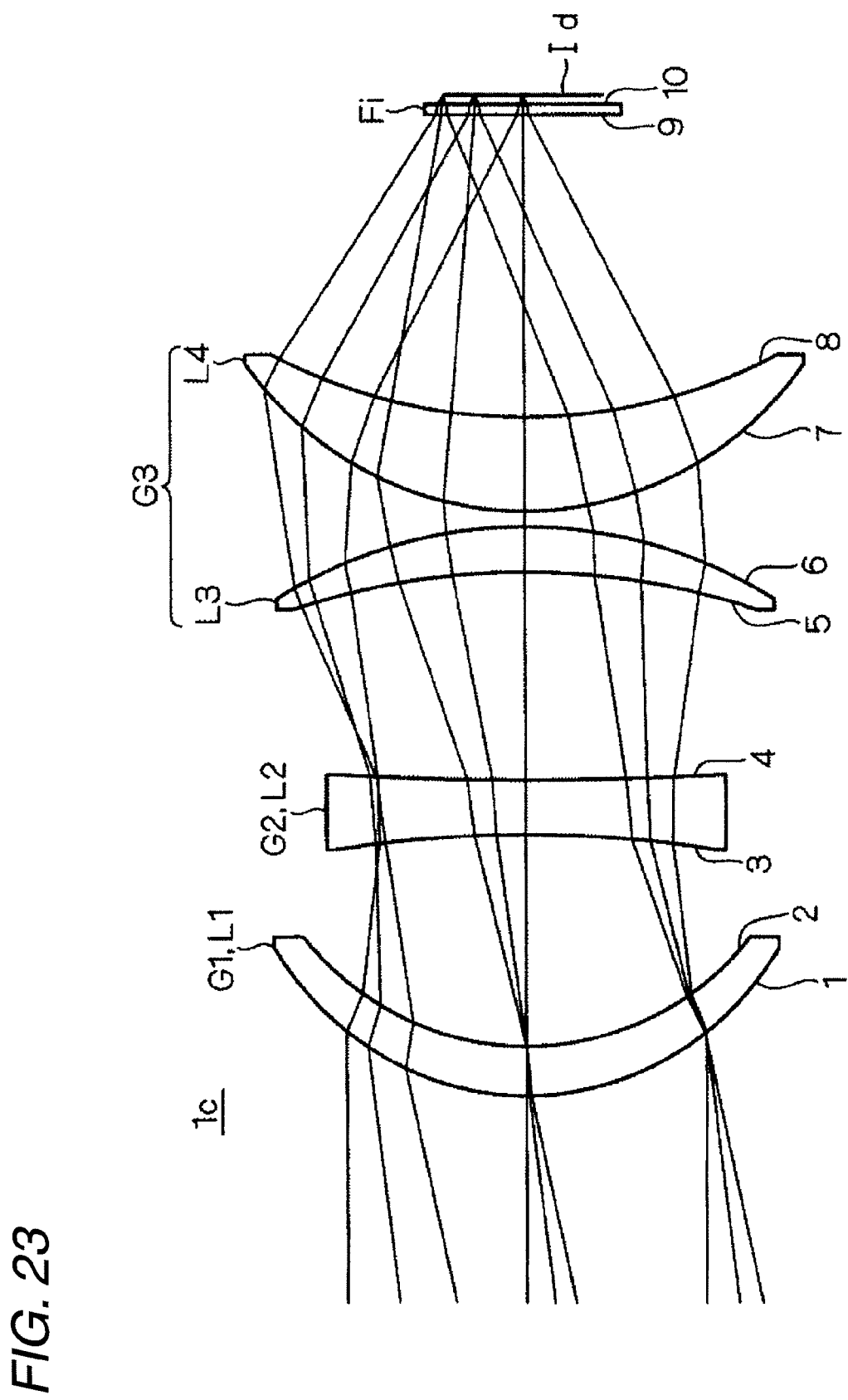
FIG. 23 is a drawing to show the configuration at the wide angle time in example 3 of an infrared zoom lens according to the embodiment of the invention.
Figure 24:
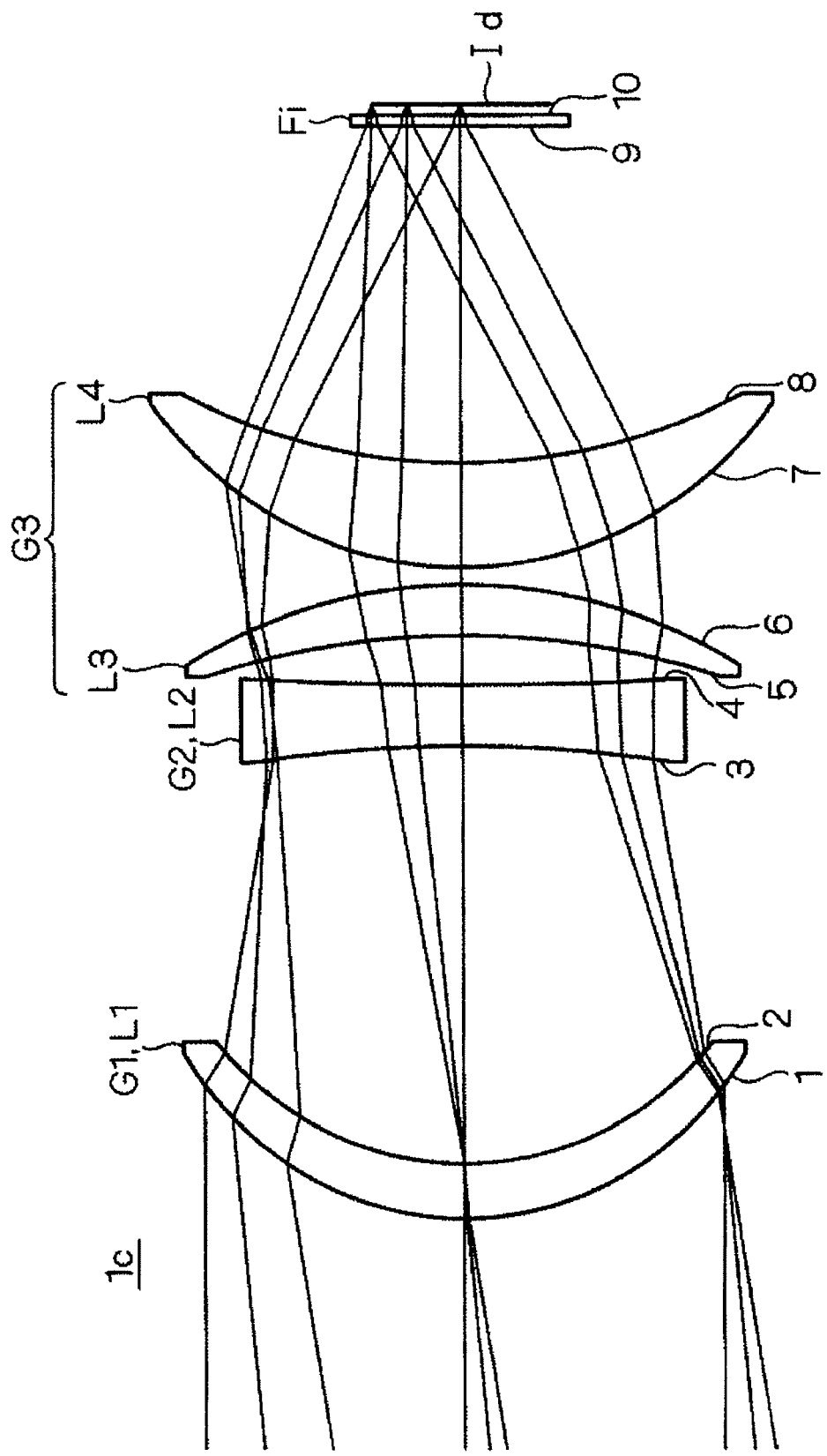
FIG. 24 is a drawing to show the configuration in telephotography in example 3 of the infrared zoom lens according to the embodiment of the invention.
Figure 27:
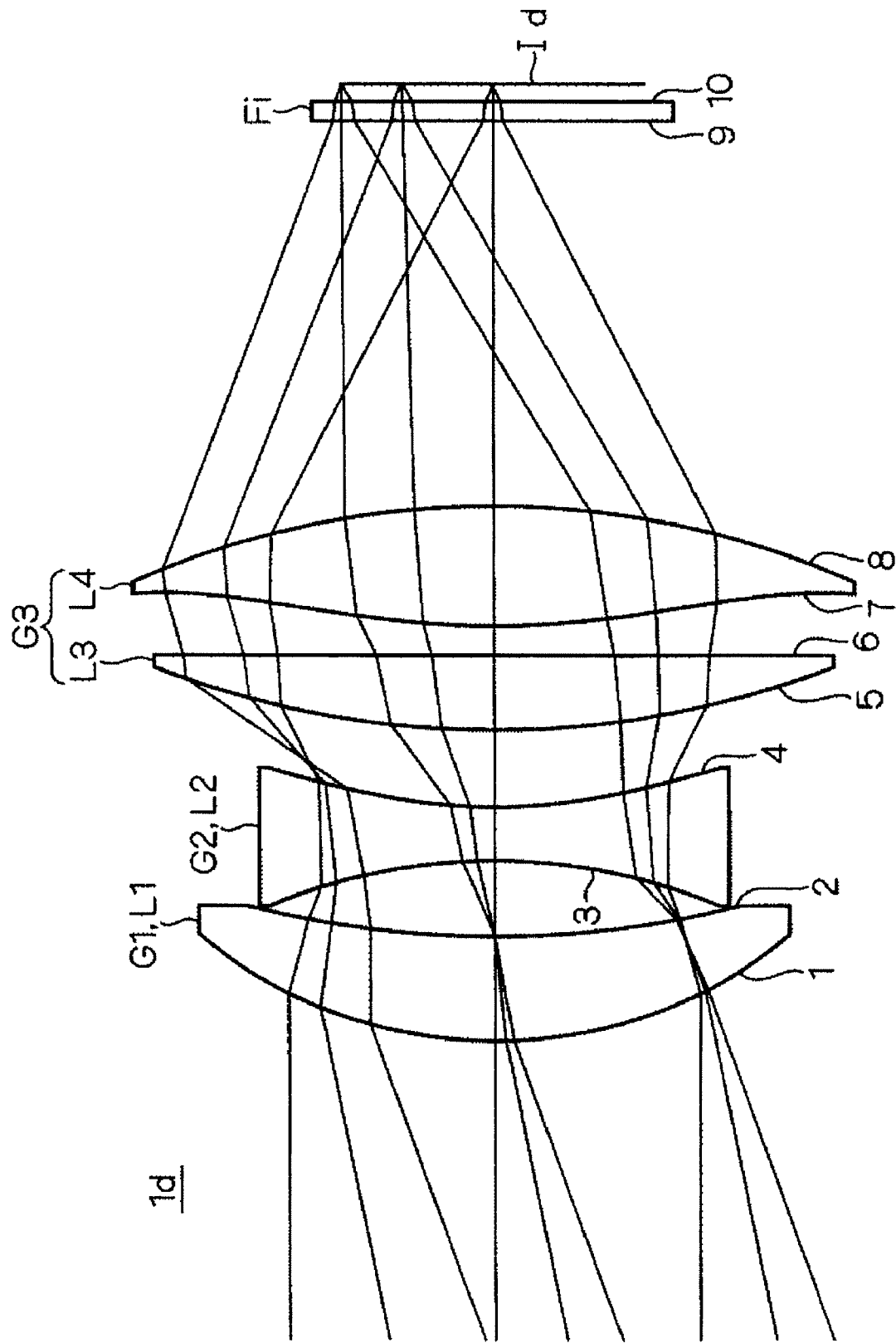
FIG. 27 is a drawing to show the configuration at the wide angle time in example 4 of an infrared zoom lens according to the embodiment of the invention.
Figure 28:
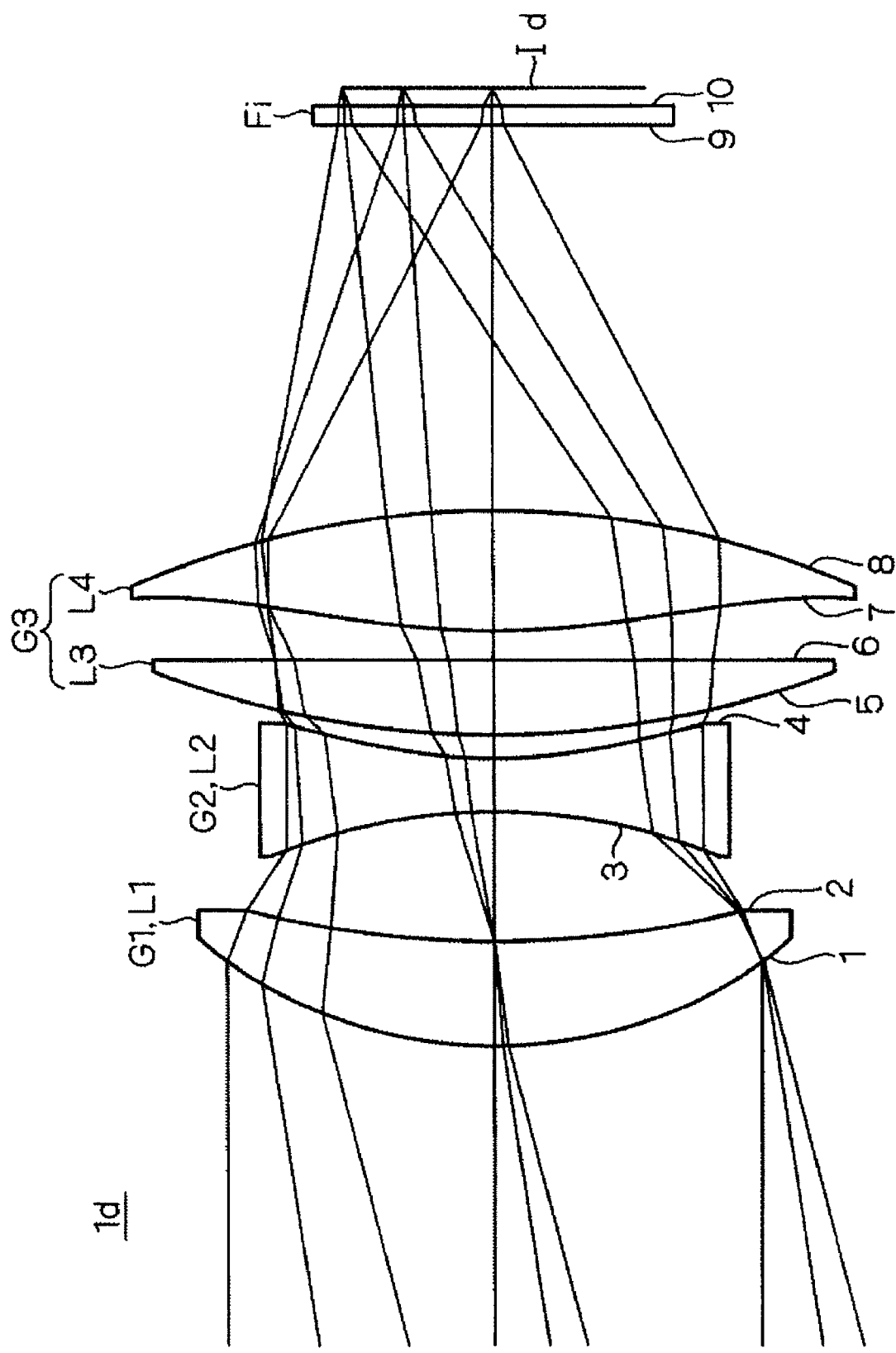
FIG. 28 is a drawing to show the configuration in telephotography in example 4 of the infrared zoom lens according to the embodiment of the invention.
Figure 31:
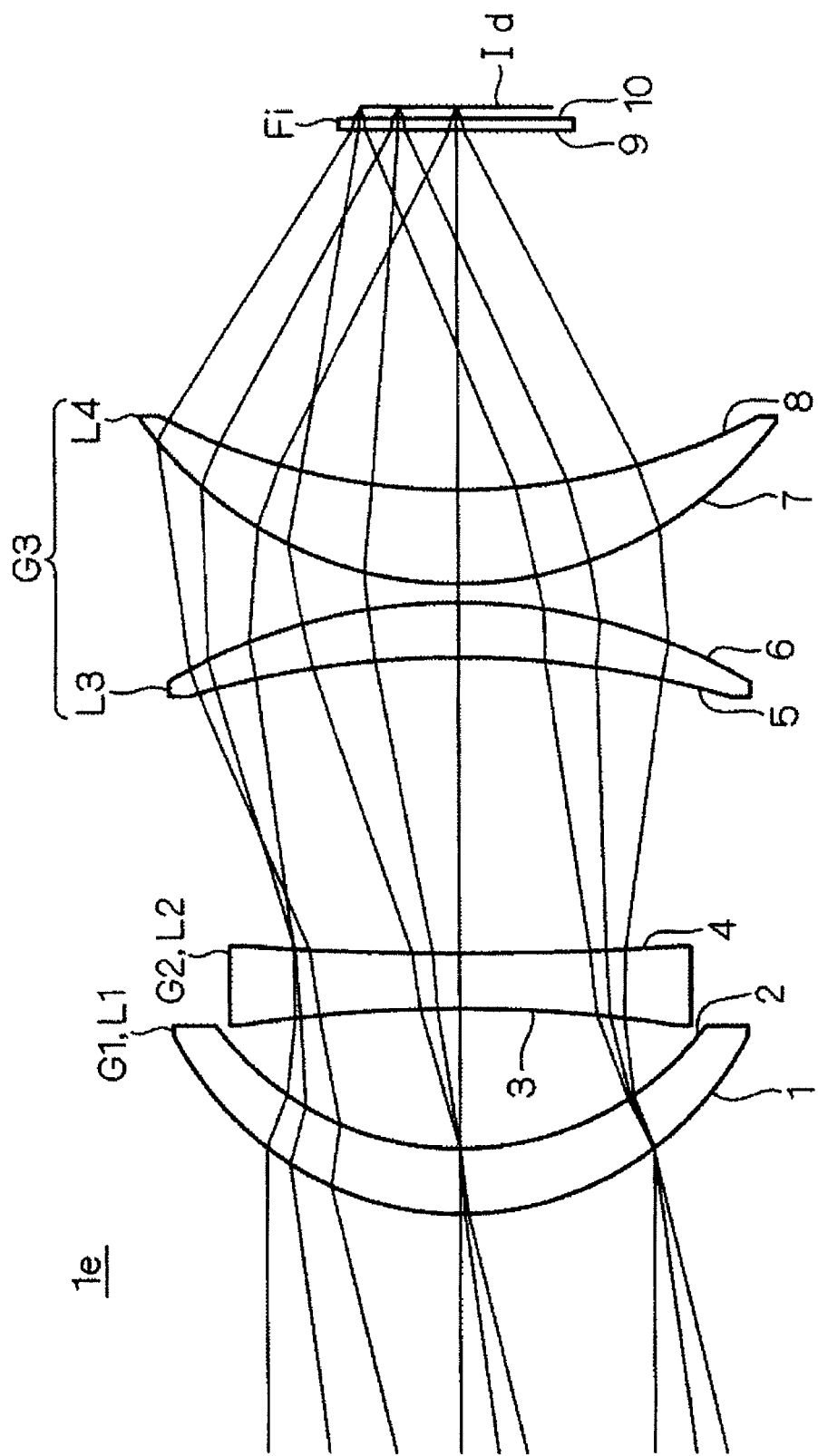
FIG. 31 is a drawing to show the configuration at the wide angle time in example 5 of an infrared zoom lens according to the embodiment of the invention.
Figure 32:
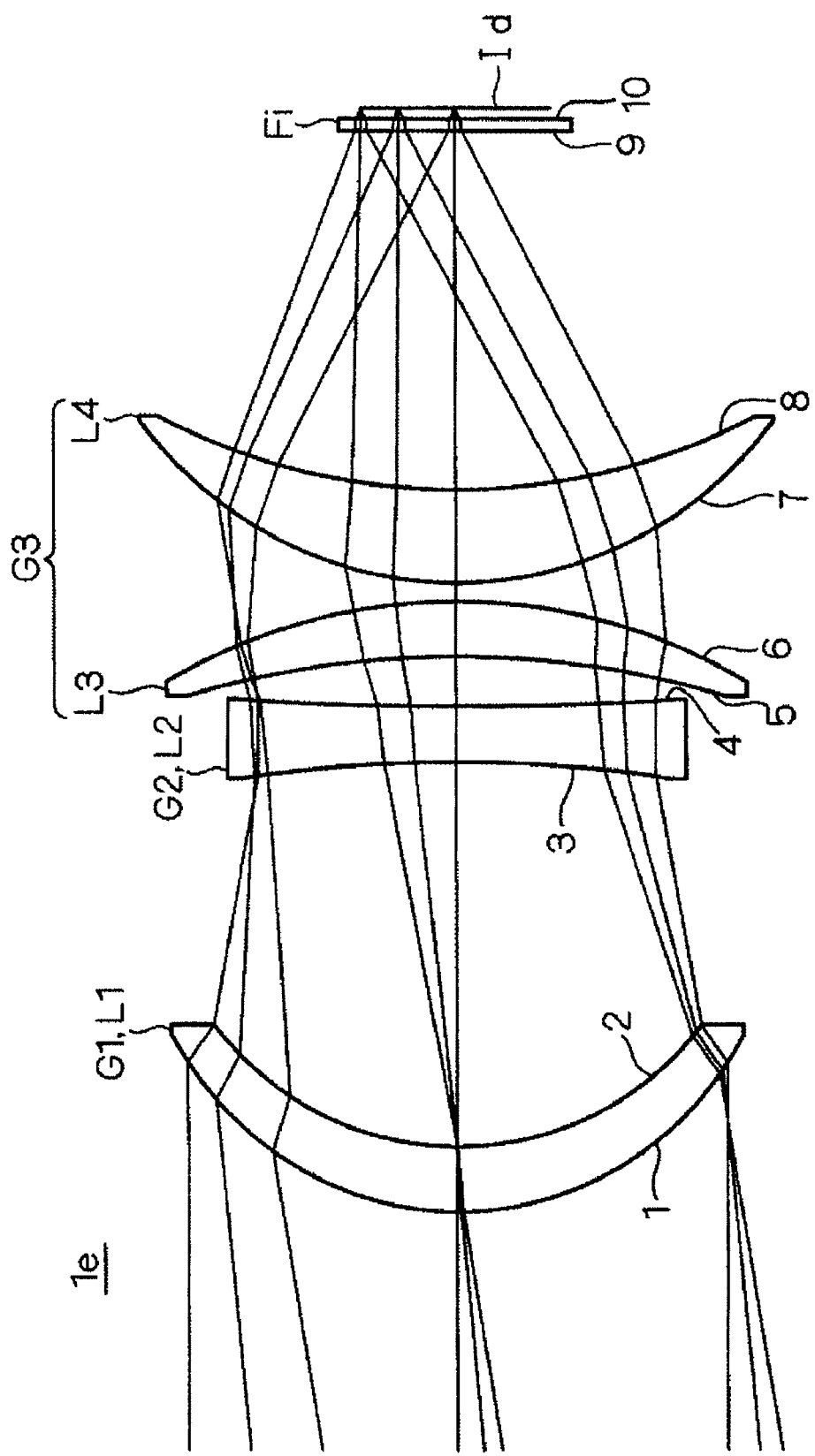
FIG. 32 is a drawing to show the configuration in telephotography in example 5 of the infrared zoom lens according to the embodiment of the invention.
Figure 35:
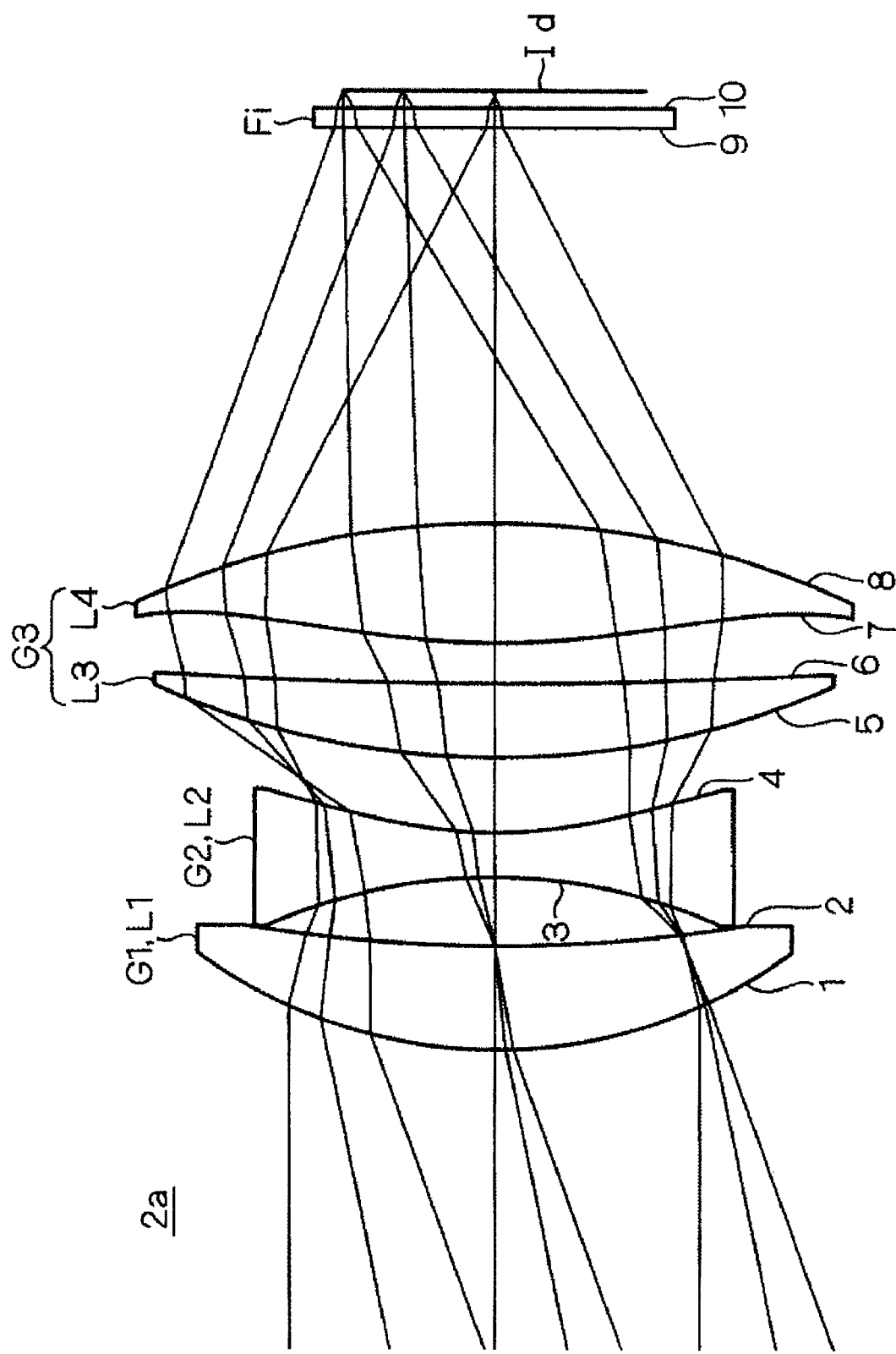
FIG. 35 is a drawing to show the configuration at the wide angle time in comparison example 1.
Figure 36:
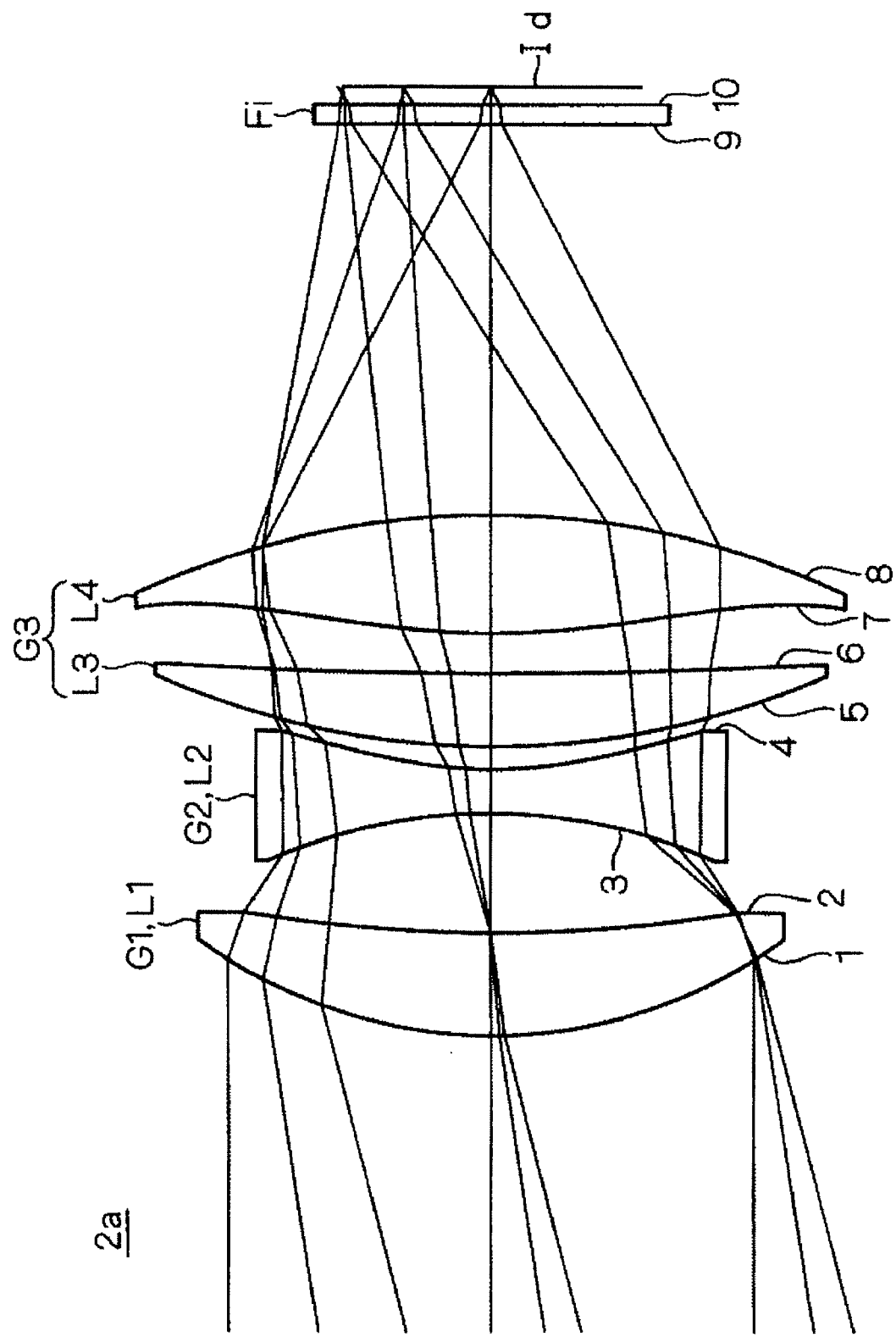
FIG. 36 is a drawing to show the configuration in telephotography in comparison example 1.
Figure 39:
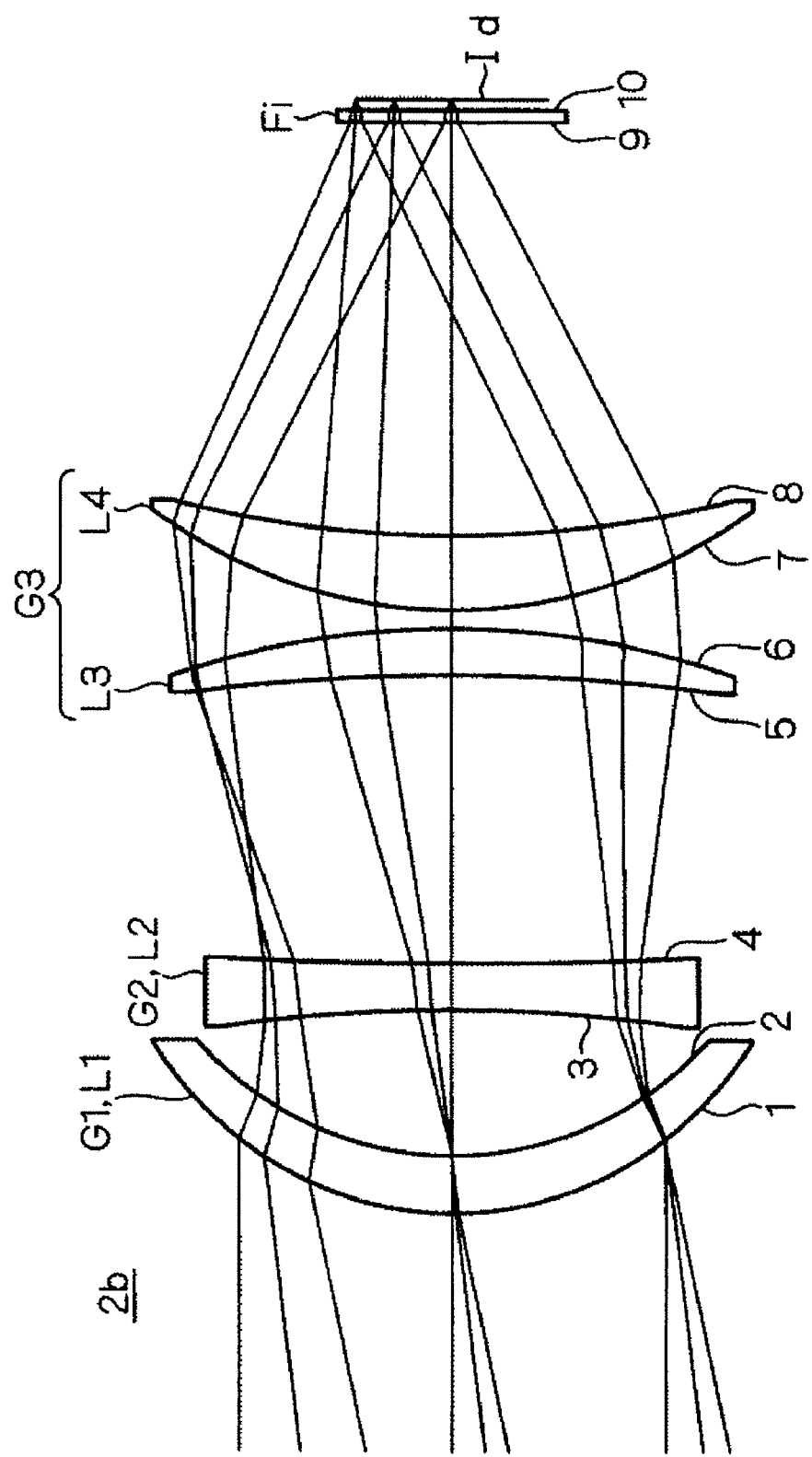
FIG. 39 is a drawing to show the configuration at the wide angle time in comparison example 2.
Figure 40:
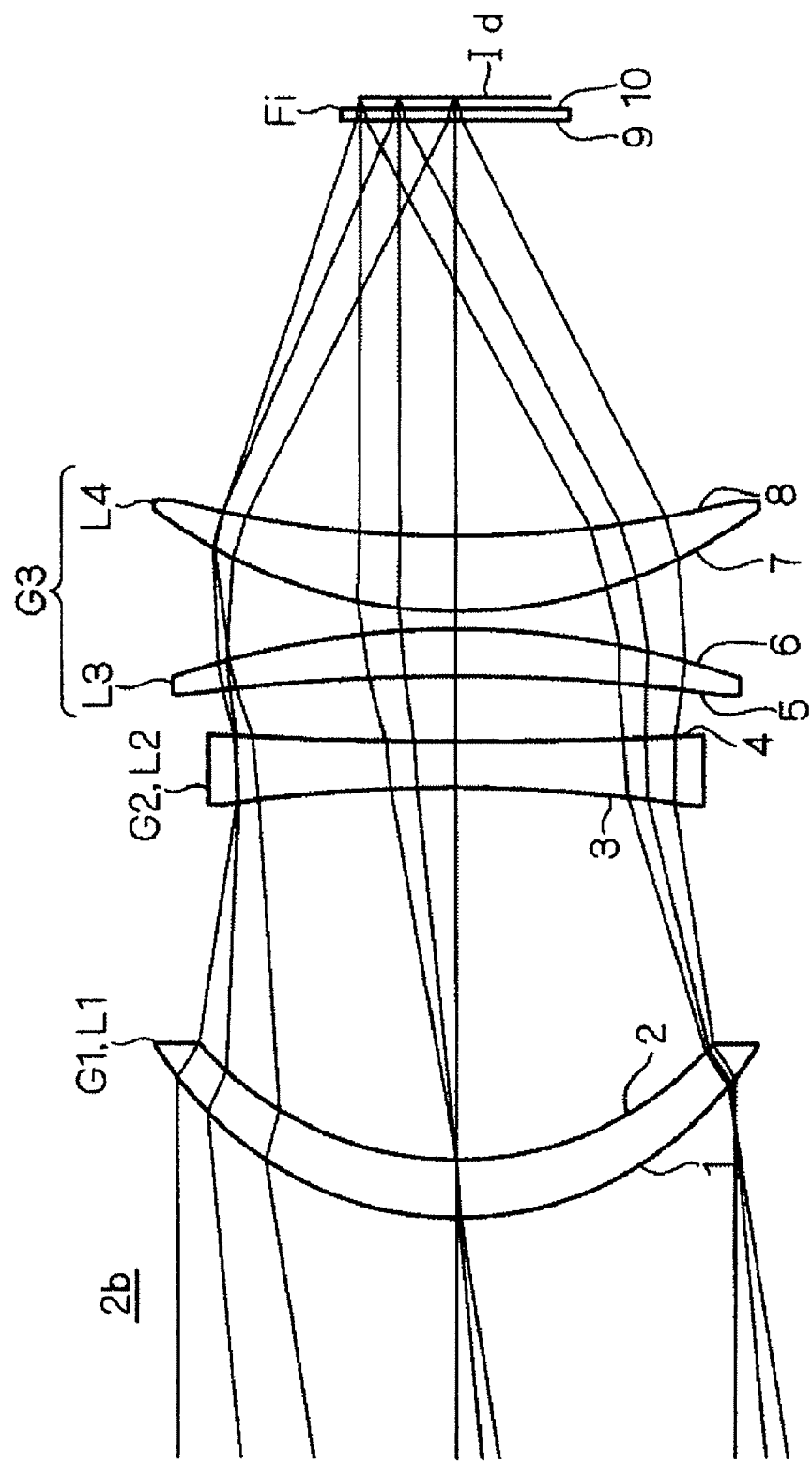
FIG. 40 is a drawing to show the configuration in telephotography in comparison example 2.
Figure 43:
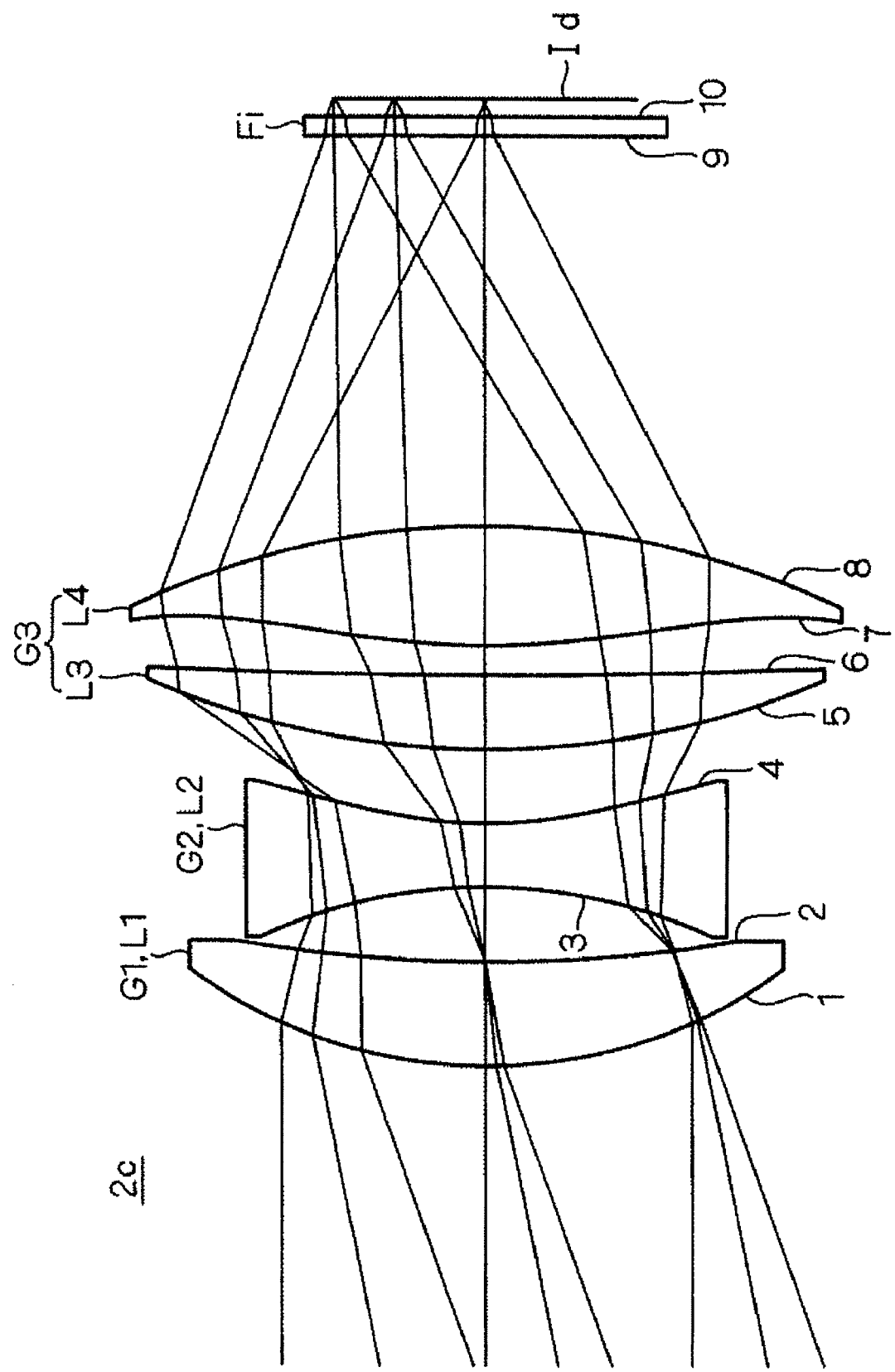
FIG. 43 is a drawing to show the configuration at the wide angle time in comparison example 3.
Figure 44:
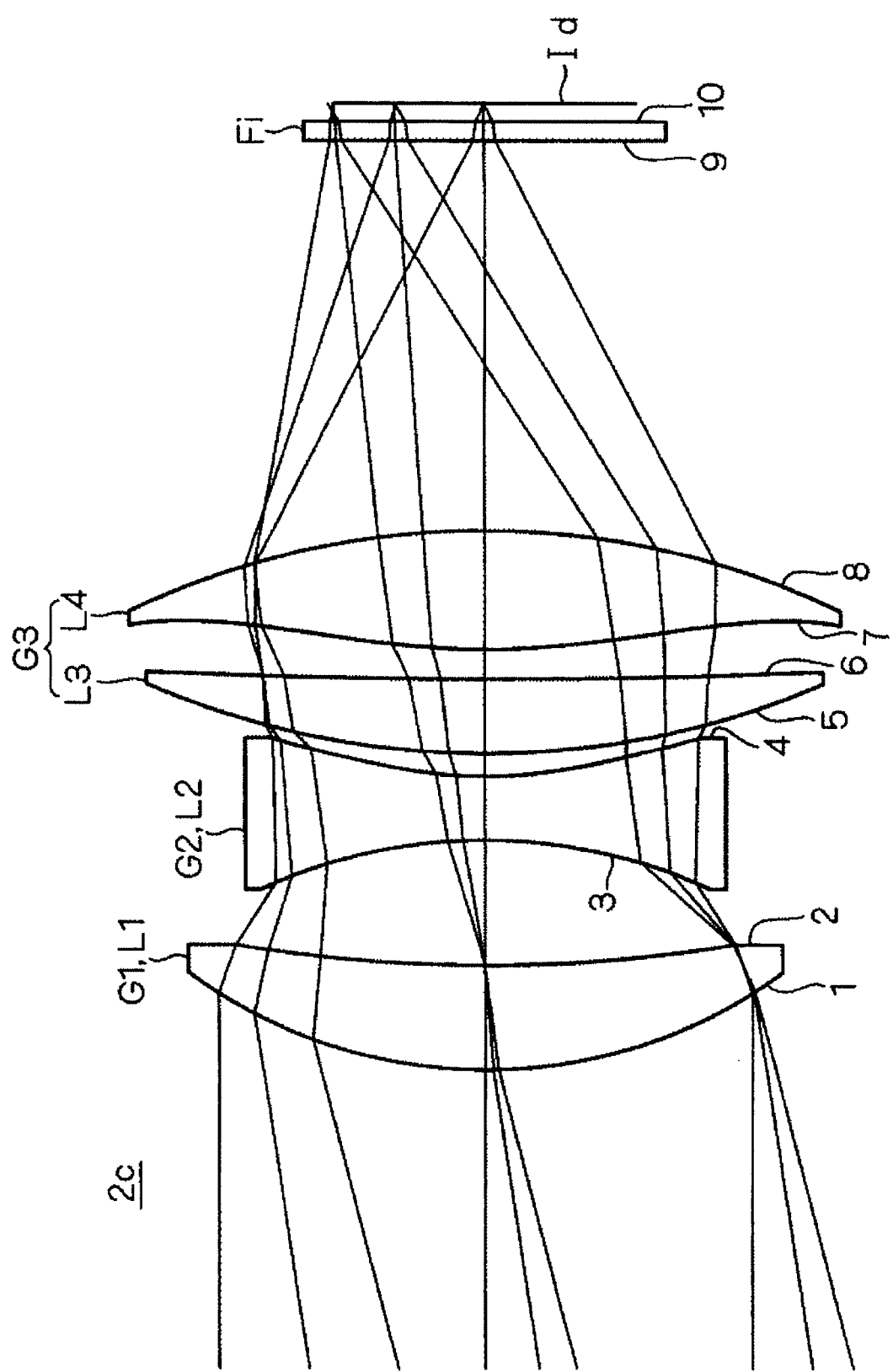
FIG. 44 is a drawing to show the configuration in telephotography in comparison example 3.
Figure 47:
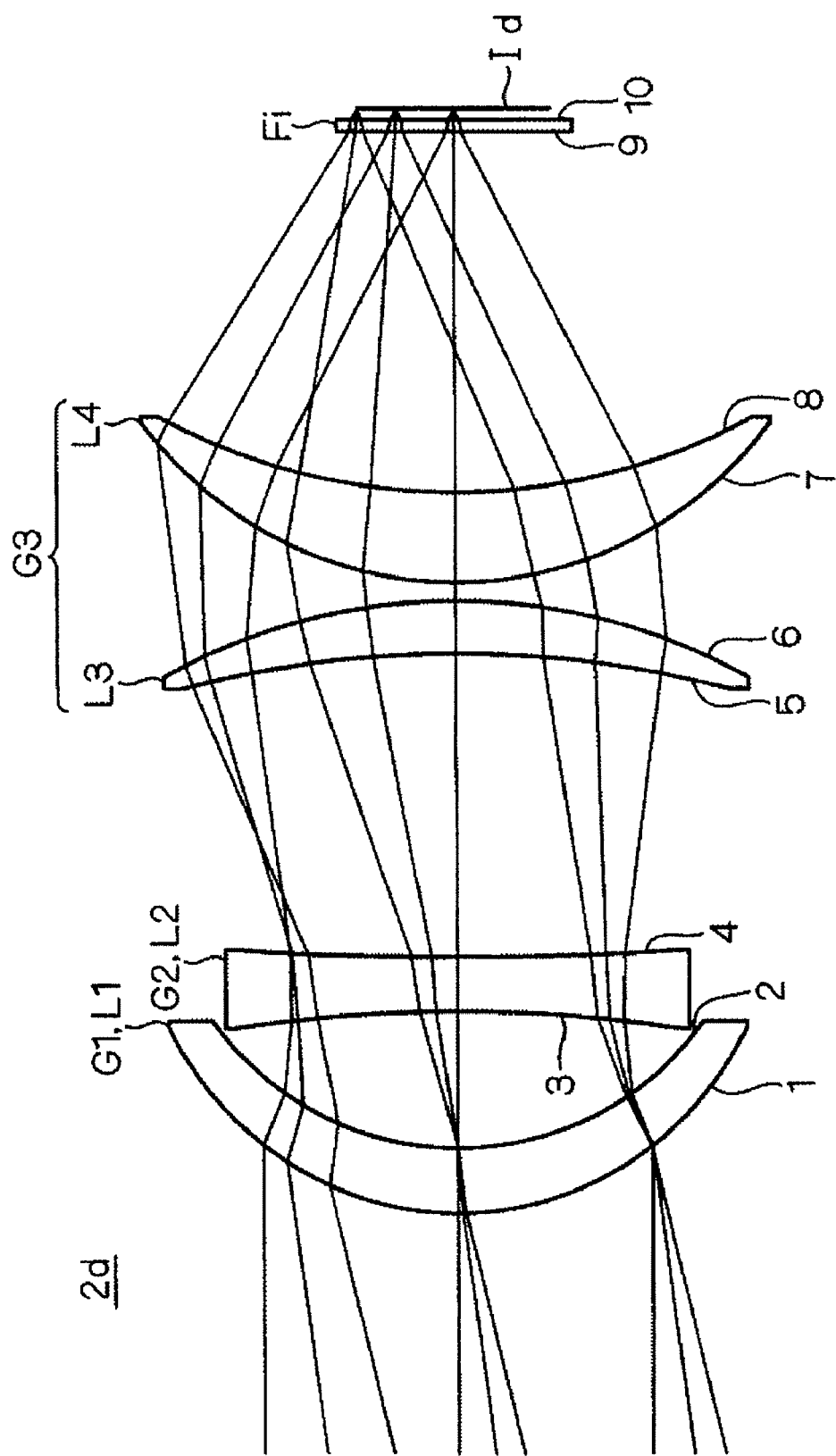
FIG. 47 is a drawing to show the configuration at the wide angle time in comparison example 4.
Figure 48:
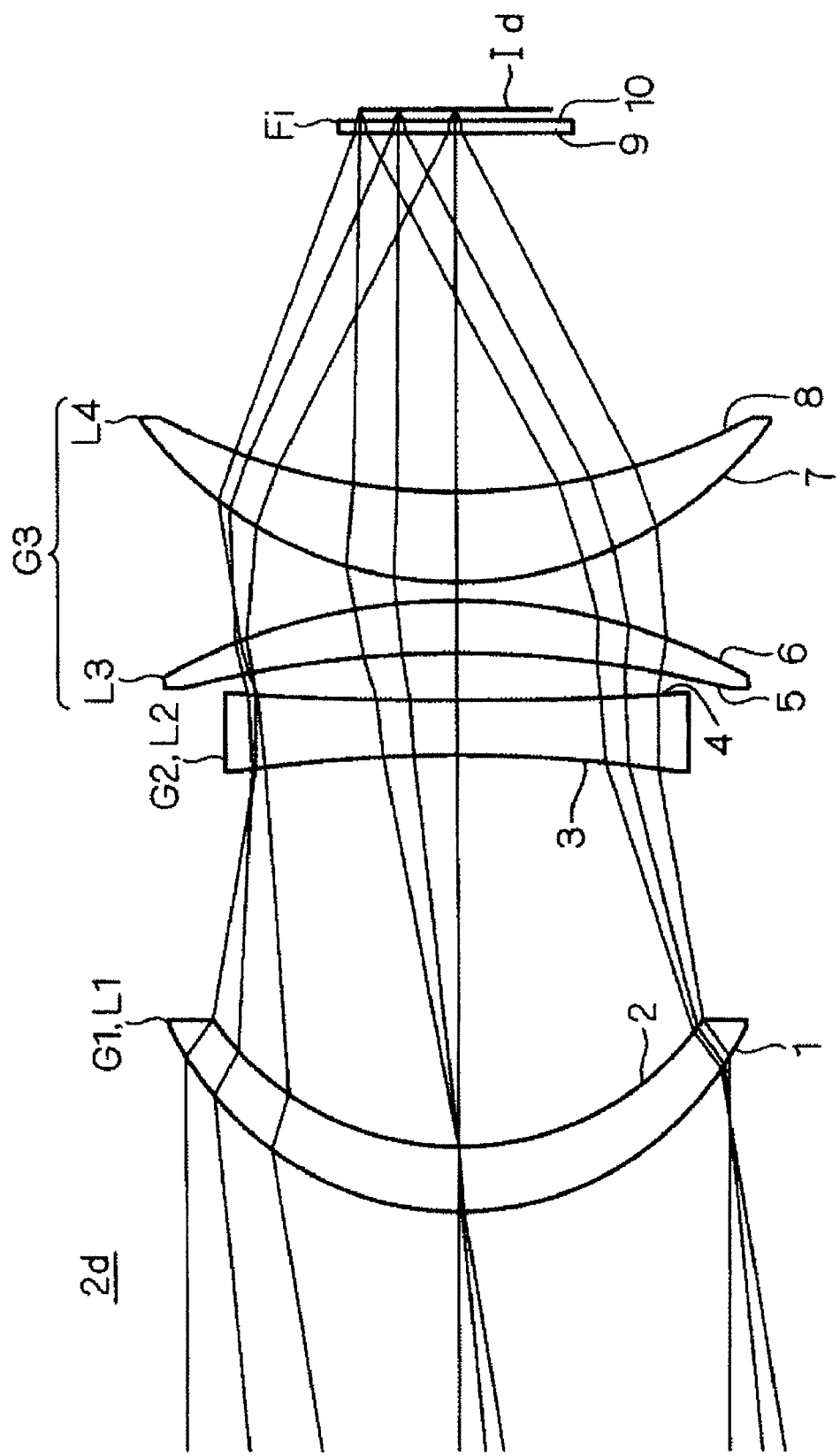
FIG. 48 is a drawing to show the configuration in telephotography in comparison example 4.

Spherical aberration, astigmatism, and distortion for wavelengths 8 μm, 10 μm, and 12 μm in wide-angle and telephotographic modes are characteristics as shown in FIGS. 11 to 16. Lateral aberrations for wavelengths 8 μm, 10 μm, and 12 μm corresponding to the image heights within the viewing angle (at wide angle time: 0°, 8.71°, 14.97°/at telephotographic time: 0°, 6.64°, 11.19°) are characteristics as shown in FIGS. 17 (*a*) to 17 (*c*) and FIGS. 18 (*a*) to 18 (*c*) (in the figures, the left side corresponds to tangential and the right side corresponds to sagittal).

Example 2

An infrared zoom lens 1*b* according to example 2 has the configuration shown in FIGS. 19 to 22, f1/ft is set to 0.986, the F value is set to 1.1, and the viewing angle is set to 40 degrees→29 degrees (however, the viewing angle is a value when the infrared zoom lens is combined with an image pickup device Id with pixel pitch 25 μm and pixel size 320× 240).

Also in the configuration in example 2, the MTF characteristic, etc., for wavelengths 8 μm, 10 μm, and 12 μm within the viewing angle (at wide angle time: 0°, 11.54°, 19.77°/at telephotographic time: 0°, 8.75°, 14.50°) are examined and the result is described later based on FIG. 51 (*b*).

Example 3

An infrared zoom lens 1*c* according to example 3 has the configuration shown in FIGS. 23 to 26, f1/ft is set to 3.355, the F value is set to 1.1, and the viewing angle is set to 24 degrees→18 degrees (however, the viewing angle is a value when the infrared zoom lens is combined with an image pickup device Id with pixel pitch 25 μm and pixel size 320× 240).

Also in the configuration in example 3, the MTF characteristic, etc., for wavelengths 8 μm, 10 μm, and 12 μm within the viewing angle (at wide angle time: 0°, 6.94°, 11.83°/at telephotographic time: 0°, 5.32°, 8.97°) are examined and the result is described later based on FIG. 52 (*b*).

Example 4

An infrared zoom lens 1*d* according to example 4 has the configuration shown in FIGS. 27 to 30, f2/ft is set to −0.351, the F value is set to 1.1, and the viewing angle is set to 40 degrees→29 degrees (however, the viewing angle is a value when the infrared zoom lens is combined with an image pickup device Id with pixel pitch 25 μm and pixel size 320× 240).

Also in the configuration in example 4, the MTF characteristic, etc., for wavelengths 8 μm, 10 μm, and 12 μm within the viewing angle (at wide angle time: 0°, 11.56°, 19.83°/at telephotographic time: 0°, 8.77°, 14.57°) are examined and the result is described later based on FIG. 54 (*b*).

Example 5

An infrared zoom lens 1*e* according to example 5 has the configuration shown in FIGS. 31 to 34, f2/ft is set to −1.236, the F value is set to 1.1, and the viewing angle is set to 27 degrees→19 degrees (however, the viewing angle is a value when the infrared zoom lens is combined with an image pickup device Id with pixel pitch 25 μm and pixel size 320× 240).

Also in the configuration in example 5, the MTF characteristic, etc., for wavelengths 8 μm, 10 μm, and 12 μm within the viewing angle (at wide angle time: 0°, 7.79°, 13.54°/at telephotographic time: 0°, 5.50°, 9.34°) are examined and the result is described later based on FIG. 55 (*a*).

Comparison Example 1

An infrared zoom lens 2*a* according to comparison example 1 has the configuration shown in FIGS. 35 to 38, f1/ft is set to 0.954, the F value is set to 1.1, and the viewing angle is set to 40 degrees→29 degrees (however, the viewing angle is a value when the infrared zoom lens is combined with an image pickup device Id with pixel pitch 25 μm and pixel size 320×240).

Also in the configuration in comparison example 1, the MTF characteristic, etc., for wavelengths 8 μm, 10 μm, and 12 μm within the viewing angle (at wide angle time: 0°, 11.54°, 19.75°/at telephotographic time: 0°, 8.74°, 14.49°) are examined and the result is described later based on FIG. 51 (*a*).

Comparison Example 2

An infrared zoom lens 2*b* according to comparison example 2 has the configuration shown in FIGS. 39 to 42, f1/ft is set to 3.518, the F value is set to 1.1, and the viewing angle is set to 24 degrees→18 degrees (however, the viewing angle is a value when the infrared zoom lens is combined with an image pickup device Id with pixel pitch 25 μm and pixel size 320×240).

Also in the configuration in comparison example 2, the MTF characteristic, etc., for wavelengths 8 μm, 10 μm, and 12 μm within the viewing angle (at wide angle time: 0°, 6.94°, 11.83°/at telephotographic time: 0°, 5.32°, 8.97°) are examined and the result is described later based on FIG. 53.

Comparison Example 3

An infrared zoom lens 2c according to comparison example 3 has the configuration shown in FIGS. 43 to 46, f2/ft is set to −0.334, the F value is set to 1.1, and the viewing angle is set to 39 degrees→29 degrees (however, the viewing angle is a value when the infrared zoom lens is combined with an image pickup device Id with pixel pitch 25 μm and pixel size 320×240).

Also in the configuration in comparison example 3, the MTF characteristic, etc., for wavelengths 8 μm, 10 μm, and 12 μm within the viewing angle (at wide angle time: 0°, 11.45°, 19.52°/at telephotographic time: 0°, 8.75°, 14.50°) are examined and the result is described later based on FIG. 54 (a).

Comparison Example 4

An infrared zoom lens 2d according to comparison example 4 has the configuration shown in FIGS. 47 to 50, f2/ft is set to −1.276, the F value is set to 1.1, and the viewing angle is set to 27 degrees→19 degrees (however, the viewing angle is a value when the infrared zoom lens is combined with an image pickup device Id with pixel pitch 25 μm and pixel size 320×240).

Also in the configuration in comparison example 4, the MTF characteristic, etc., for wavelengths 8 μm, 10 μm, and 12 μm within the viewing angle (at wide angle time: 0°, 7.78°, 13.53°/at telephotographic time: 0°, 5.50°, 9.34°) are examined and the result is described later based on FIG. 55 (b).

[Summary]

FIGS. 51 (a), 51 (b), 52 (a), 52 (b), and 53 are tables listing the MTF characteristics, etc., of examples 1 to 3 and comparison examples 1 and 2 corresponding to the parameter condition (1) mentioned above and appear in the order of comparison example 1, example 2, example 1, example 3, and comparison example 2. FIGS. 54 (a), 54 (b), 55 (a), and 55 (b) are tables listing the MTF characteristics, etc., of examples 4 and 5 and comparison examples 3 and 4 corresponding to the parameter condition (2) mentioned above and appear in the order of comparison example 4, example 4, example 5, and comparison example 4. The MTF values in the tables are values in spatial frequency 20 lp/mm.

As the evaluation criterion concerning the optical performance of the infrared zoom lens with the wavelength range of 8 to 12 μm as the target, assuming a combination with the image pickup device Id with pixel pitch 25 μm, for example, it is known empirically that if the MTF in the spatial frequency 20 lp/mm falls below 0.1, the image contrast is largely degraded.

Then, examples 1 to 5 and comparison examples 1 to 4 described above are evaluated based on whether or not the MTF is 0.1 or more at all angles of field and all wavelengths of 8 to 12 μm from wide angle to telephotography. For examples 1 to 5 wherein the values of f1/ft and f2/ft satisfy the parameter conditions (1) and (2) mentioned above according to the MTF characteristics listed in the tables, the MTF of 0.1 or more is obtained at all angles of field and all wavelengths from wide angle to telephotography; however, for comparison examples 1 to 4 wherein the values of f1/ft and f2/ft do not satisfy the parameter condition (1) or (2) mentioned above, a portion where the MTF of 0.1 or more is not obtained occurs at any angle of field or any wavelength from wide angle to telephotography. Accordingly, to obtain the MTF of 0.1 or more at all angles of field and all wavelengths from wide angle to telephotography, it is seen that the values of f1/ft and f2/ft may be set so as to satisfy the parameter conditions (1) and (2) mentioned above.

Application Example

Figure 56:
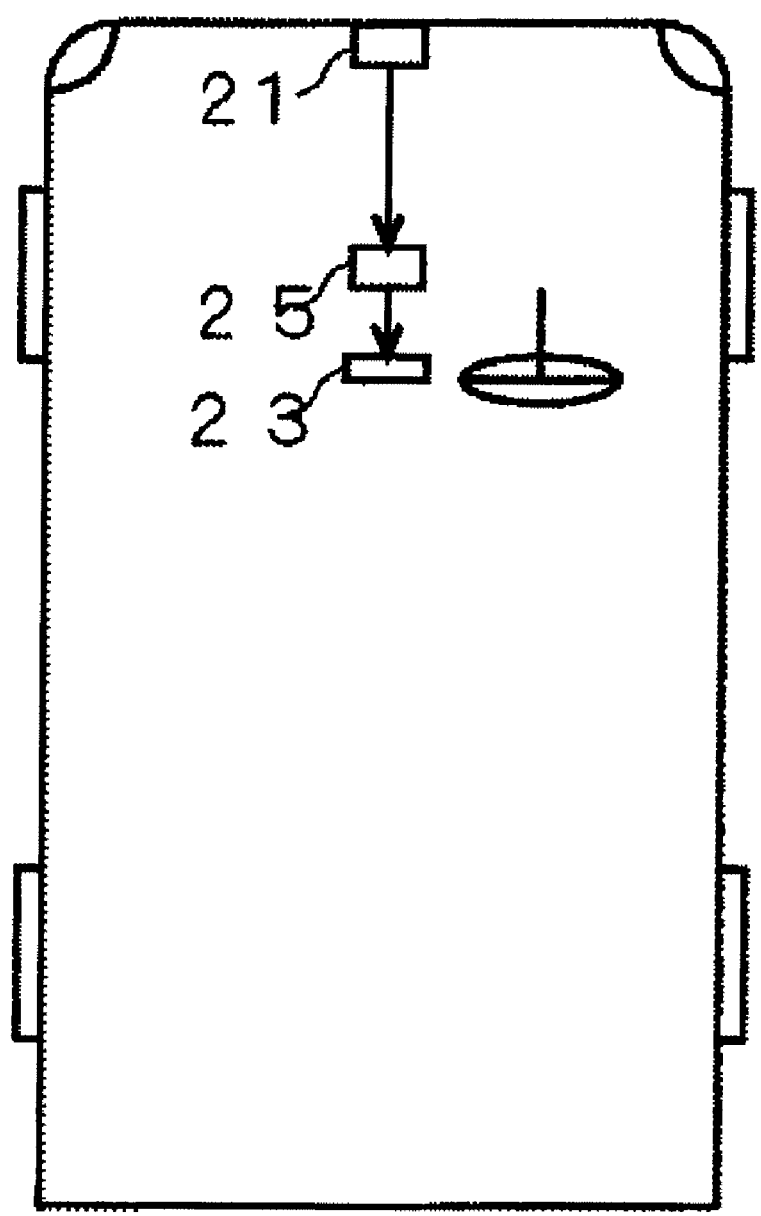
FIG. 56 is a drawing to schematically show the configuration of night vision.
Figure 57:
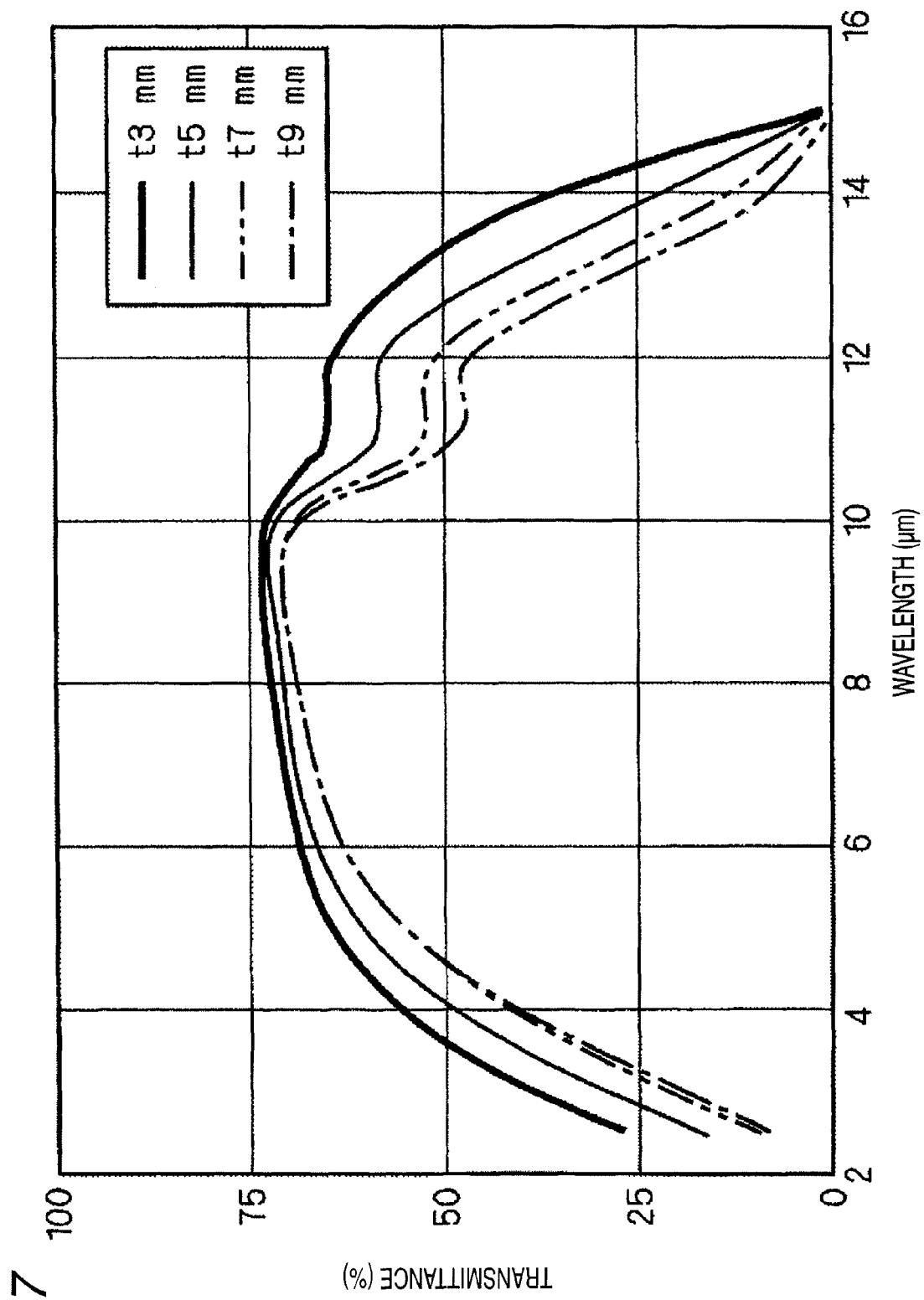
FIG. 57 is a graph to show the relationship between the infrared wavelength and transmittance of a zinc sulfide lens (with no coating) about several lens thicknesses.

Application of the infrared zoom lens 1a to 1e according to the embodiment to vehicle-installed night vision will be discussed below: The night vision is made up of an infrared camera 21 installed in the front end, etc., of a vehicle, a display section 23 implemented as a liquid crystal display, etc., provided at a position visible from a driving seat in the vehicle interior, and a control section 25 for performing image processing (such as processing of extracting a human being from the image based on contrast) based on the image picked up by the infrared camera 21 and displaying a warning image, etc., on the display section 23 based on the processing result, as shown in FIG. 56. As a modified example, the image picked up by the infrared camera 21 may be simply displayed on the display section 23.

The infrared camera 21 is made up of the infrared zoom lens 1a to 1e, the infrared-transparent window Fi, and the image pickup device Id described above and picks up an infrared image ahead of the vehicle by receiving an infrared ray emitted by an object (human being, etc.,) ahead of the vehicle at nighttime, etc.

Thus, the night vision is formed using the infrared zoom lens 1a to 1e according to the embodiment, whereby an image with a high resolution and a high contrast required for extracting a human being from the infrared image can be provided as the control section 25 performs image processing. Accordingly, it is made possible to recognize a human being in the image by performing image processing even at nighttime or even with video in the summer season with a bright scene (the luminance difference between a background and a human being (pedestrian, etc.,) lessens in the video in the summer season), for example. Since the infrared zoom lens 1a to 1e is suited to miniaturization, the infrared camera can be miniaturized and night vision that can be easily installed in a vehicle can be implemented.

The zoom-type infrared camera 21 can be formed by using the infrared zoom lens 1a to 1e according to the embodiment, so that night vision that can switch between the telephotographic mode and the wide-angle mode in response to the run state of the vehicle can be configured.

The invention claimed is:
1. An infrared zoom lens comprising:
a first lens group, a second lens group, and a third lens groups in order from the object side, wherein
the infrared zoom lens has a zoom function, and during operation of the zoom function, said second lens group moves while said first and third lens groups remain fixed,
each of said first lens group, second lens group, and third lens group has at least one lens formed of zinc sulfide, wherein the following condition is satisfied:

$$0.97 < f1/ft < 3.40$$

where
ft is the focal length of most telephotographic side of whole of first lens group, second lens group, and third lens group and
f1 is the focal length of first lens group.
2. The infrared zoom lens as claimed in claim 1, wherein at least one of lens surfaces included in said first lens group, second lens group, and third lens group is a diffraction surface.

3. The infrared zoom lens as claimed in claim 1, wherein at least one of lens surfaces included in said first and third lens groups is an aspheric surface.

4. The infrared zoom lens as claimed in claim 1, wherein outer diameter Rd of every lens included in said first lens group, second lens group, and third lens group satisfies the following relational expression:

Rd<40 mm.

5. An infrared camera, comprising:

an infrared zoom lens as claimed in claim 1; and an image pickup device for picking up an image formed through said infrared zoom lens.

6. An infrared zoom lens comprising:

a first lens group, a second lens group, and a third lens group in order from the object side, wherein at the zooming time, said second lens group is moved in a state in which said first and third lens groups are fixed, said first lens group is made up of one or two lenses and has a positive refractive power, said second lens group is made up of one or two lenses and has a negative refractive power, said third lens group is made up of two or more lenses and has a positive refractive power as the whole lens group and also has a positive meniscus lens with a convex face pointed at the object side as a final lens on the image surface side, and all lenses that said first to third lens group have are formed of zinc sulfide.

7. An infrared zoom lens comprising:

a first lens group, a second lens group, and a third lens group in order from the object side, wherein at the zooming time, said second lens group is moved in a state in which said first and third lens groups are fixed, and each of said first lens group, second lens group, and third lens group has at least one lens formed of zinc sulfide, wherein the following condition is satisfied:

$-1.25 < f2/ft < -0.34$ where ft is the focal length of most telephotographic side of whole of first lens group, second lens group, and third lens group and f2 is the focal length of second lens group.

8. An infrared zoom lens comprising:

a first lens group, a second lens group, and a third lens group in order from the object side, wherein at the zooming time, said second lens group is moved in a state in which said first and third lens groups are fixed, each of said first lens group, second lens group, and third lens group has at least one lens formed of zinc sulfide, and a center thickness Tm and an edge thickness Te of every lens included in said first to third lens groups satisfy the following relational expressions:

1.5 mm<Tm<8.0 mm 1.0 mm<Te<8.0 mm.

* * * * *

UNITED STATES PATENT AND TRADEMARK OFFICE
CERTIFICATE OF CORRECTION

PATENT NO. : 7,859,747 B2
APPLICATION NO. : 12/281257
DATED : December 28, 2010
INVENTOR(S) : Hiraiwa et al.

Page 1 of 1

It is certified that error appears in the above-identified patent and that said Letters Patent is hereby corrected as shown below:

On the Title Page:

Item "(75) Inventors:" lines 1-2, replace both instances of "Osaka (JP)" with -- Osaka-shi (JP) --.

In the Claims:

In column 12, Claim 1, lines 49-50, replace "third lens groups" with -- third lens group --.

In column 12, Claim 1, line 53, after "remain fixed," insert -- and --.

In column 12, Claim 1, lines 60-61, after "whole of" insert -- said --.

In column 13, Claim 6, line 28, replace "that said first to third lens group have" with -- in said first lens group, second lens group, and third lens group --.

In column 14, Claim 7, lines 11-12, after "whole of" insert -- said --.

In column 14, Claim 8, line 25, replace "said first to third lens groups satisfy" with -- said first lens group, second lens group, and third lens group satisfy --.

Signed and Sealed this
Twenty-seventh Day of March, 2012

David J. Kappos
*Director of the United States Patent and Trademark Office*